(12) United States Patent
Hiraishi et al.

(10) Patent No.: US 12,030,973 B2
(45) Date of Patent: Jul. 9, 2024

(54) THERMOPLASTIC RESIN COMPOSITION AND MOLDED ARTICLE OF SAME

(71) Applicant: Techno-UMG Co., Ltd., Tokyo (JP)

(72) Inventors: Kentaro Hiraishi, Tokyo (JP); Yoshiaki Shinohara, Tokyo (JP); Ichiro Kamata, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 18/284,192

(22) PCT Filed: Feb. 22, 2022

(86) PCT No.: PCT/JP2022/007413
§ 371 (c)(1),
(2) Date: Sep. 26, 2023

(87) PCT Pub. No.: WO2022/209442
PCT Pub. Date: Oct. 6, 2022

(65) Prior Publication Data
US 2024/0092961 A1    Mar. 21, 2024

(30) Foreign Application Priority Data
Mar. 29, 2021  (JP) ................. 2021-054509

(51) Int. Cl.
| | | |
|---|---|---|
| C08F 283/12 | (2006.01) | |
| C08F 220/18 | (2006.01) | |
| C08F 220/40 | (2006.01) | |
| C08F 285/00 | (2006.01) | |
| C08G 77/20 | (2006.01) | |
| C08K 5/14 | (2006.01) | |
| C08L 25/12 | (2006.01) | |

(52) U.S. Cl.
CPC .... *C08F 283/124* (2013.01); *C08F 220/1804* (2020.02); *C08F 220/40* (2013.01); *C08F 285/00* (2013.01); *C08G 77/20* (2013.01); *C08K 5/14* (2013.01); *C08L 25/12* (2013.01); *C08L 2205/025* (2013.01); *C08L 2205/03* (2013.01)

(58) Field of Classification Search
CPC .... C08F 283/124; C08F 220/40; C08L 25/12; C08L 51/085; C08L 51/06; C08L 2205/026
See application file for complete search history.

(56) References Cited

U.S. PATENT DOCUMENTS

| | | | | |
|---|---|---|---|---|
| 3,725,332 A | * | 4/1973 | Carrock | ............... C08F 279/04 524/776 |
| 2019/0375874 A1 | * | 12/2019 | Iwanaga | ................. C08F 2/24 |

FOREIGN PATENT DOCUMENTS

| | | |
|---|---|---|
| JP | 2004-346187 | 12/2004 |
| JP | 2004-352842 | 12/2004 |
| JP | 2005-139332 | 6/2005 |
| JP | 2005-307074 | 11/2005 |
| JP | 2007-77274 | 3/2007 |
| JP | 2019-19216 | 2/2019 |
| JP | 2019019216 | * 2/2019 |

OTHER PUBLICATIONS

International Search Report issued May 17, 2022 in International (PCT) Application No. PCT/JP2022/007413.

* cited by examiner

*Primary Examiner* — Mark S Kaucher
(74) *Attorney, Agent, or Firm* — Wenderoth, Lind & Ponack, L.L.P.

(57) ABSTRACT

A thermoplastic resin composition comprising: a graft copolymer (A) obtained by polymerizing a vinyl monomer mixture (m1) in the presence of a specific alkyl (meth) acrylate rubbery polymer (a); a graft copolymer (B) obtained by polymerizing a vinyl monomer mixture (m2) in the presence of a specific alkyl (meth)acrylate rubbery polymer (b); and a vinyl copolymer (C) obtained by polymerizing a vinyl monomer mixture (m3), wherein: a proportion of a rubbery polymer contained in the thermoplastic resin composition is 21 to 28% by mass, and a proportion of particles with a particle size of 300 nm or more among all particles formed by the rubbery polymer is 1 to 11% by mass.

6 Claims, 1 Drawing Sheet

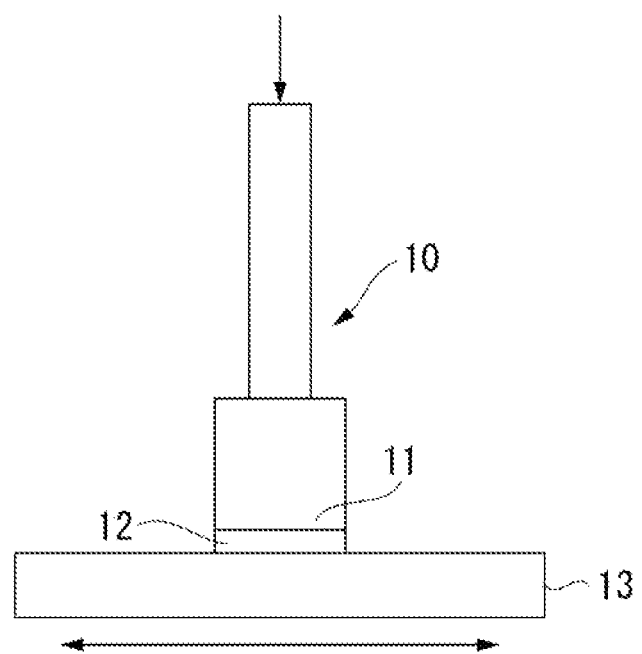

THERMOPLASTIC RESIN COMPOSITION AND MOLDED ARTICLE OF SAME

TECHNICAL FIELD

The present invention relates to a thermoplastic resin composition and a molded product thereof.

Priority is claimed on Japanese Patent Application No. 2021-054509, filed Mar. 29, 2021, the contents of which are incorporated herein by reference.

Background Art

The improvement of the impact resistance of molded products increases their industrial values in terms of, for example, expansion of the applications of the molded products. Therefore, various methods have been proposed heretofore to improve the impact resistance of molded products. Among such methods, there is an already industrialized method, which uses a resin material in which a rubbery polymer and a hard resin are combined to enhance the impact resistance of molded products while retaining the inherent properties of the hard resin. Examples of such resin materials include acrylonitrile-styrene-acrylate (ASA) resins, acrylonitrile-ethylene/α-olefin-styrene (AES) resins, and thermoplastic resin compositions obtained by further adding these to hard resins.

With respect to a thermoplastic resin composition that can provide a molded product having improved impact resistance while retaining the inherent properties of the hard resin, for example, the following compositions have been proposed.

(1) A thermoplastic resin composition in which an AES resin is added to a maleimide copolymer as a hard resin (Patent Literature 1).

(2) A thermoplastic resin composition in which an AES resin and an ASA resin are added to a methacrylate resin as a hard resin (Patent Literature 2).

(3) A thermoplastic resin composition in which two types of ASA resins having different particle sizes are added to a vinyl copolymer as a hard resin (Patent Literature 3).

(4) A thermoplastic resin composition in which an ASA resin containing two types of polyorganosiloxane with different particle sizes is added to a methacrylate resin as a hard resin (Patent Literature 4).

CITATION LIST

Patent Literature

Patent Literature 1: Japanese Unexamined Patent Application Publication No. 2004-352842
Patent Literature 1: Japanese Unexamined Patent Application Publication No. 2004-352842
Patent Literature 2: Japanese Unexamined Patent Application Publication No. 2007-77274
Patent Literature 4: Japanese Unexamined Patent Application Publication No. 2019-19216

SUMMARY OF INVENTION

Technical Problem

Improving the color development occurring during coloration, especially the jet-blackness in black coloration, etc., as well as the impact resistance of molded products, leads to advantages such as contribution to the expansion of applications of the molded products and the extension of product life, resulting in very high industrial value of the molded products. The impact resistance is one indicator for the strength of a material. However, the value of the material as an actual commercial product cannot really be guaranteed only by the performance evaluated by a standardized test method such as Charpy impact strength test in which a molded product of a prescribed dimension is punched with a hammer, but the performance evaluated by a test method designed taking practical utility into consideration, such as falling ball impact test, is also required. Further, assuming the use of products in automotive applications, etc., it is also necessary to improve the performances under low temperature environments, taking into consideration the possible use in cold regions. In other words, the evaluations by test methods such as high-speed surface impact test and falling ball impact test under low temperature environments are also very important. In fact, the falling ball impact resistance under low temperature environments often differs from that measured under a normal temperature environment, while no such difference is observed in the case of the Charpy impact strength.

However, in the thermoplastic resin composition described in Patent Literature 1, it is necessary to add a large amount of AES resin having a relatively large particle size in order to improve the impact resistance of a molded product, resulting in decreased color development of the molded product.

In the thermoplastic resin composition described in Patent Literature 2, AES resin and ASA resin are added in order to suppress the decrease in color development of a molded product, but the impact resistance of the molded article is inferior to the case where only the AES resin is added.

In the thermoplastic resin composition described in Patent Literature 3, two types of ASA resins having different particle sizes are added to AS resin, but the color development is not sufficient due to the large particle size.

In the thermoplastic resin composition described in Patent Literature 4, ASA resin containing polyorganosiloxane is added to a methacrylate resin, but the amount of rubber is small, and the falling ball impact resistance of the resulting molded product under low temperature environments is not satisfactory.

The object of the present invention is to provide a thermoplastic resin composition that can provide a molded product excellent in impact resistance, falling ball impact resistance under low temperature environments, as well as color development, and to provide such a molded product.

Solution to Problem

The embodiments of the present invention are as follows.
[1] A thermoplastic resin composition including a graft copolymer (A), a graft copolymer (B), and a vinyl copolymer (C), wherein:
a proportion of a rubbery polymer contained in the thermoplastic resin composition is 21 to 28% by mass, based on a total mass of the thermoplastic resin composition, and a proportion of particles with a particle size of 300 nm or more among all particles formed by the rubbery polymer is 1 to 11% by mass, based on a total mass of the all particles,
the graft copolymer (A) is a graft copolymer obtained by polymerizing 80 to 20% by mass of a vinyl monomer mixture (m1) in the presence of an alkyl (meth)acrylate rubbery polymer (a) containing 0.2 parts by mass or more and less than 0.9 parts by mass of polyfunctional monomer units per 100 parts by mass of alkyl (meth) acrylate monomer units, provided that a sum of amounts of the alkyl (meth)acrylate rubbery polymer (a) and the vinyl monomer mixture (m1) is 100% by mass, wherein the alkyl (meth)acrylate rubbery polymer (a) has a volume average particle size of 70 nm or more and less than 130 nm, the graft copolymer (B) is a graft copolymer obtained by polymerizing 80 to 20% by mass of a vinyl monomer mixture (m2) in the presence of an alkyl (meth)acrylate rubbery polymer (b) containing 0.9 to 2.2 parts by mass of polyfunctional monomer units per 100 parts by mass of alkyl (meth)acrylate monomer units, provided that a sum of amounts of the alkyl (meth)acrylate rubbery polymer (b) and the vinyl monomer mixture (m2) is 100% by mass, wherein the alkyl (meth)acrylate rubbery polymer (b) has a volume average particle size of 130 nm to 200 nm, and the vinyl copolymer (C) is a vinyl copolymer obtained by polymerizing a vinyl monomer mixture (m3) comprising an alkyl (meth)acrylate monomer.

[2] The thermoplastic resin composition according to [1], wherein the alkyl (meth)acrylate rubbery polymer (a) is a rubbery polymer including a polyorganosiloxane.

[3] The thermoplastic resin composition according to [1] or [2], wherein the alkyl (meth)acrylate rubbery polymer (b) is a rubbery polymer including a polyorganosiloxane.

[4] The thermoplastic resin composition according to [2] or [3], wherein the polyorganosiloxane preferably has vinyl-polymerizable functional group-containing siloxane units, and more preferably the vinyl-polymerizable functional group-containing siloxane units and dimethylsiloxane units.

[5] The thermoplastic resin composition according to [4], wherein the polyorganosiloxane contains 0.3 to 3 mol % of the vinyl-polymerizable functional group-containing siloxane units, and 99.7 to 97 mol % of the dimethylsiloxane units, relative to the total number of moles (100 mol %) of units constituting the polyorganosiloxane, provided that a sum of amounts of the vinyl-polymerizable functional group-containing siloxane units and the dimethylsiloxane units is 100 mol %).

[6] The thermoplastic resin composition according to any one of [2] to [5], wherein the polyorganosiloxane has a mass average particle size of preferably 20 to 400 nm, more preferably 20 to 150 nm.

[7] The thermoplastic resin composition according to any one of [1] to [6], wherein the vinyl monomer mixture (m3) includes 50 to 99% by mass of the alkyl (meth)acrylate monomer, 1 to 50% by mass of an aromatic vinyl monomer, and 0 to 49% by mass of a vinyl monomer (other monomer) copolymerizable therewith, based on a total mass of the vinyl monomer mixture (m3).

[8] The thermoplastic resin composition according to [7], wherein the vinyl monomer mixture (m3) contains a maleimide monomer as the other monomer.

[9] The thermoplastic resin composition according to [8], wherein a proportion of the maleimide monomer is 5 to 49% by mass, based on a total mass of the vinyl monomer mixture (m3).

[10] The thermoplastic resin composition according to any one of [1] to [9], wherein a proportion of the alkyl (meth)acrylate rubbery polymer (a) is 30 to 90% by mass, and a proportion of the alkyl (meth)acrylate rubbery polymer (b) is 70 to 10% by mass, provided that a sum of amounts of the alkyl (meth)acrylate rubbery polymer (a) and the alkyl (meth)acrylate rubbery polymer (b) is 100% by mass.

[11] The thermoplastic resin composition according to any of [1] to [10], wherein a proportion of particles with a particle size of 300 nm or more among all particles formed by the alkyl (meth)acrylate rubbery polymer (b) is preferably 10 to 30% by mass, more preferably 10 to 25% by mass, even more preferably 10 to 18% by mass, based on a total mass of the alkyl (meth)acrylate rubbery polymer (b).

[12] The thermoplastic resin composition according to any one of [1] to [11], which contains a resin component consisting of the copolymer (A), the graft copolymer (B) and the vinyl copolymer (C).

[13] The thermoplastic resin composition according to [12], wherein a proportion of the resin component is more than 50% by mass and 100% by mass or less, more preferably 70 to 100% by mass, even more preferably 90 to 100% by mass, based on a total mass of the thermoplastic resin composition.

[14] The thermoplastic resin composition of [12] or [13], which further includes an optional component (E) other than the resin component, and a proportion of the resin component is more than 50% by mass and less than 100% by mass, more preferably 70 to 99.5% by mass, more preferably 80 to 99% by mass, particularly preferably 90 to 98.5% by mass, most preferably 95 to 98% by mass, based on a total mass of the thermoplastic resin composition.

[15] A molded product using the thermoplastic resin composition of any one of [1] to [14] above.

Advantageous Effects of Invention

The invention can provide a thermoplastic resin composition that can provide a molded product excellent in impact resistance, falling ball impact resistance under low temperature environments, as well as color development, and can provide such a molded product.

BRIEF DESCRIPTION OF DRAWINGS

FIG. 1 is a schematic diagram illustrating a scratch resistance test using Kanakin No. 3.

DESCRIPTION OF EMBODIMENTS

Throughout the present specification and claims, the following terms have respective means as explained below.

The term "(meta)acrylate" is a generic term for acrylate and methacrylate.

The term "(meta)acrylic acid" is a generic term for acrylic acid and methacrylic acid.

The "molded product" is a product obtained by molding the thermoplastic resin composition of the first embodiment of the present invention.

The term "low temperature" means a temperature of 0° C. or lower.

The term "scratch resistance" means at least one of a resistance to scratches occurring when the surface of a molded product is scratched with a hard and sharp object such as a nail, and a resistance to damages (scratches) occurring when the surface of a molded product is rubbed with a soft material such as cotton gloves, gauze, or cloth.

Further, "to" indicating a numerical range means that the numerical values described before and after "to" are included as the lower limit and the upper limit of the range.

[Thermoplastic Resin Composition]

The thermoplastic resin composition of the first aspect of the present invention includes a graft copolymer (A), a graft copolymer (B) and a vinyl copolymer (C), which are described below.

The thermoplastic resin composition of the first aspect of the present invention may optionally include a thermoplastic resin (hereinafter also referred to as "other thermoplastic resin (D)") other than the graft copolymer (A), the graft copolymer (B) and the vinyl copolymer (C), and an optional component (E) other than the resin component, as far as the effects of the present invention are not impaired.

Since the copolymer (A), the graft copolymer (B), and the vinyl copolymer (C) are essential resin components, the thermoplastic resin composition of the first aspect of the present invention can be regarded as a composition including a resin component. The resin component includes the copolymer (A), the graft copolymer (B) and the vinyl copolymer (C). The resin component may consist only of the copolymer (A), the graft copolymer (B) and the vinyl copolymer (C), or may further include the other thermoplastic resin (D) as necessary. The resin component preferably consists only of the copolymer (A), the graft copolymer (B) and the vinyl copolymer (C). That is, the thermoplastic resin composition of the first aspect of the present invention preferably includes the resin component, which consists only of the copolymer (A), the graft copolymer (B) and the vinyl copolymer (C).

[Graft Copolymer (A)]

The graft copolymer (A) is a graft copolymer obtained by polymerizing a vinyl monomer mixture (m1) in the presence of an alkyl (meth)acrylate rubbery polymer (a).

As regards the graft copolymer (A), it is difficult to specify how the vinyl monomer mixture (m1) is polymerized in the presence of the alkyl (meth)acrylate rubbery polymer (a). That is, there exists a situation (impossible/impractical situation) which makes it impossible or almost impractical to directly specify the graft copolymer (A) in terms of its structure or properties. Therefore, it is more appropriate to define the graft copolymer (A) as "obtained by polymerizing the vinyl monomer mixture (m1) in the presence of the alkyl (meth)acrylate rubbery polymer (a)". The same applies to the graft copolymer (B) described below.

With respect to the proportions of the alkyl (meth)acrylate rubbery polymer (a) and the vinyl monomer mixture (m1), it is preferable that the proportion of the alkyl (meth)acrylate rubbery polymer (a) is 20 to 80% by mass and the proportion of the vinyl monomer mixture (m1) is 20 to 80% by mass, and it is more preferable that the proportion of the alkyl (meth)acrylate rubbery polymer (a) is 30 to 70% by mass and the proportion of the vinyl monomer mixture (m1) is 30 to 70% by mass, with the proviso that a sum of amounts of the alkyl (meth)acrylate rubbery polymer (a) and the vinyl monomer mixture (m1) is 100% by mass. When the proportion of the alkyl (meth)acrylate rubbery polymer (a) is 20% by mass or more, the impact resistance of the molded product improves. When this proportion is 80% by mass or less, the color development of the molded product improves, and the fluidity of the thermoplastic resin composition tends to increase as well.

<Alkyl (Meth)Acrylate Rubbery Polymer (a)>

The alkyl (meth)acrylate rubbery polymer (a) is a polymer having alkyl (meth)acrylate monomer units and polyfunctional monomer units.

The alkyl (meth)acrylate rubbery polymer (a) may further has monomer (other monomer) units other than the alkyl (meth)acrylate monomer units and the polyfunctional monomer units.

The number of carbon atoms in the alkyl group in the alkyl (meth)acrylate monomer is, for example, preferably 1 to 20.

Examples of alkyl (meth)acrylate monomers include monofunctional monomers. More specific examples thereof include alkyl acrylates, such as methyl acrylate, ethyl acrylate, n-propyl acrylate, n-butyl acrylate, and 2-ethylhexyl acrylate; and alkyl methacrylates, such as hexyl methacrylate, 2-ethylhexyl methacrylate, and n-lauryl methacrylate. One of these alkyl (meth)acrylates may be used alone, or two or more of these may be used in combination. Among these, n-butyl acrylate is preferable in terms of further improvement of the impact resistance of the molded product.

The proportion of the alkyl (meth)acrylate monomer units in the alkyl (meth)acrylate rubbery polymer (a) is preferably 80 to 99.8% by mass, more preferably 90 to 99.8% by mass, based on the total mass of all monomer units constituting the alkyl (meth)acrylate rubbery polymer (a).

Examples of polyfunctional monomers include graft crossing agents and cross-linking agents. Specific examples thereof include allyl methacrylate, triallyl cyanurate, triallyl isocyanurate, divinylbenzene, ethylene glycol dimethacrylate, propylene glycol dimethacrylate, 1,3-butylene glycol dimethacrylate, 1,4-butylene glycol dimethacrylate, and the like. One of these polyfunctional monomers may be used alone, or two or more thereof may be used in combination.

In the alkyl (meth)acrylate rubbery polymer (a), the amount of the polyfunctional monomer units relative to 100 parts by mass of the alkyl (meth)acrylate monomer units is 0.2 parts by mass or more and less than 0.9 parts by mass (that is, 0.20 parts by mass or more and less than 0.90 parts by mass), preferably 0.3 to 0.8 parts by mass (that is, 0.30 to 0.80 parts by mass), more preferably 0.4 to 0.7 parts by weight (that is, 0.40 to 0.70 parts by weight). When the amount of the polyfunctional monomer units is 0.2 parts by mass or more, the color development of the molded product improves. When this amount is less than 0.9 parts by mass, the impact resistance of the molded product improves.

In this context, the amount (ratio) described above is calculated as a ratio of the amount of the polyfunctional monomer units to the amount of the alkyl (meth)acrylate monomer units, but the figures obtained by this calculation are not rounded off. That is, for example, 0.899 is not to be rounded up to 0.9.

The other monomers are not particularly limited as long as they are copolymerizable with at least alkyl (meth) acrylate monomers, and examples thereof include aromatic vinyl monomers (e.g., styrene, α-methylstyrene, p-methylstyrene, etc.), vinyl cyanide monomers (e.g., acrylonitrile, methacrylonitrile, etc.), and the like. One of these other monomers may be used alone, or two or more thereof may be used in combination.

The alkyl (meth)acrylate rubbery polymer (a) is granular (particulate), and the alkyl (meth)acrylate rubbery polymer (a) forming a part of the graft copolymer (A) is present in the form of granules in the graft copolymer (A) as well as in the thermoplastic resin composition.

The volume average particle size of the alkyl (meth) acrylate rubbery polymer (a) is 70 nm or more and less than 130 nm, preferably 90 to 110 nm. When the volume average particle size of the alkyl (meth)acrylate rubbery polymer (a) is 70 nm or more, the impact resistance of the molded article improves. When the volume average particle size is less than 130 nm, the color development of the molded article improves.

In this context, the volume average particle size of the alkyl (meth)acrylate rubbery polymer (a) is a value calculated from a particle size distribution obtained by measuring the volume particle size distribution using a dynamic light scattering particle size distribution analyzer. The volume average particle size is a median diameter (d50).

In terms of improvement of scratch resistance, the alkyl (meth)acrylate rubbery polymer (a) is preferably a rubbery polymer containing polyorganosiloxane (s).

(Polyorganosiloxane (s))

The polyorganosiloxane (s) is not particularly limited, but is preferably a polyorganosiloxane having vinyl-polymerizable functional group-containing siloxane units, more preferably a polyorganosiloxane having the vinyl-polymerizable functional group-containing siloxane units and dimethylsiloxane units.

Examples of vinyl-polymerizable functional groups include methacryloyloxyalkyl groups, acryloyloxyalkyl groups, vinyl groups, and vinyl-substituted phenyl groups. The number of carbon atoms in the alkyl group in the methacryloyloxyalkyl group and the acryloyloxyalkyl group is, for example, preferably 1 to 20.

The vinyl-polymerizable functional group-containing siloxane may have organic groups other than the vinyl-polymerizable functional group. Examples of other organic groups include alkyl groups such as a methyl group, a phenyl group, and the like.

Specific examples of the vinyl-polymerizable functional group-containing siloxane are described later.

The proportion of the vinyl-polymerizable functional group-containing siloxane units is preferably 0.3 to 3 mol %, relative to the total number of moles (100 mol %) of units constituting the polyorganosiloxane (s). When the proportion of the vinyl-polymerizable functional group-containing siloxane units is within the above range, the polyorganosiloxane (s) and the alkyl (meth)acrylate polymer (a) are sufficiently combined, and the polyorganosiloxane (s) is less likely to bleed out from the surface of the molded product. This results in improvement of the color development, particularly the jet-blackness of the molded product when colored black, and improvement of the impact resistance of the molded product as well.

For further improving the color development, particularly the jet-blackness of the molded product when colored black, the polyorganosiloxane (s) is preferably one in which the proportion of a silicon atom having 3 or more siloxane bonds (that is, a silicon atom having 3 or more siloxane-derived oxygen atoms) is 0 to 1 mol %, relative to the total number of moles (100 mol %) of all silicon atoms in the polyorganosiloxane (s).

One preferred embodiment of the polyorganosiloxane (s) is a polyorganosiloxane composed of 0.3 to 3 mol % of the vinyl-polymerizable functional group-containing siloxane units and 99.7 to 97 mol % of the dimethylsiloxane units, provided that a sum of amounts of the vinyl-polymerizable functional group-containing siloxane units and the dimethylsiloxane units is 100 mol %, in which the proportion of a silicon atom having 3 or more siloxane bonds is 1 mol % or less, based on the total number of moles of all silicon atoms.

The average particle size of the polyorganosiloxane (s) is not particularly limited, but is preferably 400 nm or less, more preferably 150 nm or less in terms of further improvement of the color development of the molded product, particularly the jet-blackness of the molded product when colored black. Further, the average particle size of the polyorganosiloxane (s) is preferably 20 nm or more.

In this context, the average particle size of the polyorganosiloxane (s) is a value (mass average particle size) calculated from the particle size distribution obtained by measuring the mass-based particle size distribution using a laser diffraction or scattering type particle size distribution measuring device. The mass average particle size is a median diameter (d50).

<<Method for Producing Polyorganosiloxane (s)>>

The polyorganosiloxane (s) can be obtained, for example, by polymerizing a siloxane mixture containing a dimethylsiloxane oligomer and a vinyl-polymerizable functional group-containing siloxane.

The dimethylsiloxane oligomer is preferably a cyclic dimethylsiloxane having a 3 or more-membered ring structure, more preferably a cyclic dimethylsiloxane having a 3- to 7-membered ring structure. Specific examples thereof include hexamethylcyclotrisiloxane, octamethylcyclotetrasiloxane, decamethylcyclopentasiloxane, dodecamethylcyclohexasiloxane, and the like. One of these dimethylsiloxane oligomers may be used alone, or two or more of these may be used in combination.

The vinyl-polymerizable functional group-containing siloxane is not particularly limited as long as it contains a vinyl-polymerizable functional group and can bond with the dimethylsiloxane oligomer via a siloxane bond, but is preferably a vinyl-polymerizable functional group-containing alkoxysilane compound in consideration of the reactivity with the dimethylsiloxane oligomer.

Specific examples of vinyl-polymerizable functional group-containing alkoxysilane compounds include methacryloyloxysiloxanes, such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, and o-methacryloyloxybutyldiethoxymethylsilane; and vinyl siloxanes, such as tetramethyltetravinylcyclotetrasiloxane, and p-vinylphenyldimethoxymethylsilane. One of these vinyl-polymerizable functional group-containing siloxanes may be used alone, or two or more of these may be used in combination.

The method for polymerizing the siloxane mixture is not particularly limited, but is preferably an emulsion polymerization. The emulsion polymerization of the siloxane mixture is typically carried out using an emulsifier, water and an acid catalyst.

An anionic emulsifier is preferred as the emulsifier. Specific examples thereof include sodium alkylbenzenesulfonate, sodium laurylsulfonate, and sodium polyoxyethylene nonylphenyl ether sulfate. Among these, sulfonic acid-based emulsifiers such as sodium alkylbenzenesulfonate and sodium laurylsulphonate are preferred. One of these emulsifiers may be used alone, or two or more of these may be used in combination.

The amount of the emulsifier used is preferably 0.05 to 5 parts by mass with respect to 100 parts by mass of the siloxane mixture. When the amount of the emulsifier used is 0.05 parts by mass or more, the dispersed state of the siloxane mixture tends to be stable, and the emulsified state with fine particles can be easily maintained. On the other hand, when the emulsifier is used in an amount of 5 parts by mass or less, it is possible to suppress the discoloration of the molded product due to the emulsifier.

Examples of acid catalysts include organic acid catalysts, such as sulfonic acids (e.g., aliphatic sulfonic acids, aliphatic-substituted benzenesulfonic acids, aliphatic-substituted naphthalenesulfonic acids, etc.); and inorganic acid catalysts, such as mineral acids (e.g., sulfuric acid, hydrochloric acid, nitric acid, etc.). One of these acid catalysts may be used alone, or two or more of these may be used in combination. Among these, aliphatic-substituted benzenesulfonic acids are preferable, and n-dodecylbenzenesulfonic acid is particularly preferable in that excellent stabilizing action for the siloxane latex (sl) described later is achievable. In addition, when n-dodecylbenzenesulfonic acid and a mineral acid such as sulfuric acid are used together, the influence of the color of the emulsifier used in the production of the polyorganosiloxane (s) on the color of the molded product can be reduced.

The amount of the acid catalyst to be added may be appropriately set, but is usually about 0.1 to 20 parts by mass per 100 parts by mass of the siloxane mixture.

The acid catalyst may be mixed at the time of mixing the siloxane mixture, the emulsifier, and water, or may be mixed with micronized siloxane latex (sl) obtained by micronizing a latex (siloxane latex (sl)) obtained by emulsifying a mixture of the siloxane mixture, the emulsifier, and water.

It is preferable to mix the acid catalyst with micronized siloxane latex (sl) obtained by micronizing a siloxane latex (si), since the particle size of the resulting polyorganosiloxane (s) can be easily controlled. In particular, it is preferable to drop the micronized siloxane latex (sl) into an aqueous solution of the acid catalyst at a constant rate.

When the acid catalyst is mixed at the time of mixing the siloxane mixture, the emulsifier and water, it is preferable to micronize the resulting mixture.

The siloxane latex (sl) can be micronized by using, for example, a homomixer or a homogenizer. The homomixer implements micronization by shearing force due to high-speed rotation. The homogenizer implements micronization with ejection force of a high-pressure generator.

Examples of methods for mixing the siloxane mixture, the emulsifier, water and the acid catalyst, or methods for mixing the micronized siloxane latex (sl) and the acid catalyst include a mixing method employing high-speed stirring, and a mixing method employing a high-pressure emulsifying device such as a homogenizer. Among them, the method using a homogenizer is preferable because the distribution of the particle size of the polyorganosiloxane (sl) can be narrowed.

The polymerization temperature is preferably 50° C. or higher, more preferably 80° C. or higher.

In the case of dropping the micronized siloxane latex (sl) into the acid catalyst aqueous solution, the temperature of the acid catalyst aqueous solution is preferably 50° C. or higher, more preferably 80° C. or higher.

The polymerization time is preferably 2 hours or more, more preferably 5 hours or more, when the acid catalyst is mixed at the time of mixing the siloxane mixture, emulsifier and water. On the other hand, when the micronized siloxane latex (si) and the acid catalyst are mixed, it is preferable to drop the micronized siloxane latex (sl) into the acid catalyst aqueous solution, followed by holding the resulting for about 1 hour.

The polymerization can be terminated by neutralizing the cooled reaction solution with an alkaline substance such as sodium hydroxide, potassium hydroxide or sodium carbonate, so as to adjust the pH of the reaction solution at 25° C. to about 6 to 8.

Thus, a latex of polyorganosiloxane(s) is obtained.

The average particle size of the polyorganosiloxane (s) can be controlled by adjusting the composition of the siloxane mixture, the amount of acid catalyst used (amount of the acid catalyst in the acid catalyst aqueous solution), the polymerization temperature, and the like. For example, as the amount of acid catalyst used is decreased, the average particle size tends to increase, and as the polymerization temperature is increased, the average particle size tends to decrease.

When the alkyl (meth)acrylate rubbery polymer (a) is a rubbery polymer containing the polyorganosiloxane (s), the proportion of the polyorganosiloxane (s) is preferably 1% by mass or more and less than 20% by mass, more preferably 3% by mass or more and less than 20% by mass, even more preferably 10% by mass or more and less than 20% by mass, based on the total mass of the alkyl (meth)acrylate rubbery polymer (a). When the proportion is within this range, the molded product is more improved in terms of impact resistance, falling ball impact resistance under low temperature environments, color development, and scratch resistance.

(Method for Producing Alkyl (Meth)Acrylate Rubbery Polymer (a))

The alkyl (meth)acrylate rubbery polymer (a) is obtained, for example, by polymerizing a monomer component (a) containing 0.2 parts by mass or more and less than 0.9 parts by mass of a polyfunctional monomer with respect to 100 parts by mass of the alkyl (meth)acrylate monomer. This monomer component (a) may contain other monomers. The polymerization method is not particularly limited, and the polymerization can be carried out according to known methods.

For obtaining a rubbery polymer containing polyorganosiloxane, examples of polymerization methods include a method in which a plurality of latexes respectively containing the polyorganosiloxane (s) and the alkyl (meth) acrylate rubbery polymer (a) are heteroaggregated or co-enlarged; and a method in which, in the presence of a latex containing either one of the polyorganosiloxane (s) and the alkyl (meth)acrylate rubbery polymer (a), a monomer component for forming the other one of the polymers is polymerized to foam a composite polymers. Since the volume average particle size of the composite rubbery polymer can be easily adjusted to fall within the above range, it is preferable to employ a method including a step (radical polymerization step) of radically polymerizing the monomer component (a) in the presence of a latex of polyorganosiloxane (sl), to thereby obtain a copolymer latex.

Radical Polymerization Step:

The radical polymerization step is a step of radically polymerizing the monomer component (a). The monomer component (a) may be added to the reaction system all at once, continuously, or intermittently. For obtaining a composite rubbery polymer, the monomer component (a) may be added to the latex of polyorganosiloxane (sl) all at once, continuously or intermittently.

The polymerization conditions are preferably, for example, 30 to 95° C. for 1 to 10 hours.

A radical polymerization initiator and an emulsifier are usually used for the radical polymerization.

Examples of radical polymerization initiators include peroxides, azo initiators, redox initiators in which an oxidizing agent and a reducing agent are combined, and the like. Among these, redox initiators are preferable, and sulfoxylate initiators obtained by combining ferrous sulfate, disodium ethylenediaminetetraacetic acid, sodium formaldehyde sulfoxylate, and hydroperoxide are particularly preferred.

The emulsifier is not particularly limited, but it is preferable to use carboxylates, such as sodium sarcosinate, a potassium fatty acid ester, a sodium fatty acid ester, a dipotassium alkenyl succinate, and a rosinate soap in terms of excellent stability of the latex during the radical polymerization and higher polymerization rate. Among these, a dipotassium alkenylsuccinate is preferable because it can suppress gas generation when the obtained graft copolymer (A) and the thermoplastic resin composition containing the same are molded at high temperature. Specific examples of dipotassium alkenyl succinate include dipotassium octadecenyl succinate, dipotassium heptadecenyl succinate, and dipotassium hexadecenyl succinate. One of these emulsifiers may be used alone, or two or more of these may be used in combination.

(Vinyl Monomer Mixture (m1))

With respect to the vinyl monomer mixture (m1), there is no particular limitation as long as it includes at least one type of vinyl monomer, but the vinyl monomer mixture (m1) is preferably a monomer mixture including an aromatic vinyl monomer and a vinyl cyanide monomer. Further, the vinyl monomer mixture (m1) may include other monomers copolymerizable with the aromatic vinyl monomer and the vinyl cyanide monomer as long as the effects of the present invention are not impaired.

Examples of the aromatic vinyl monomer include styrene, α-methylstyrene, o-, m- or p-methylstyrene, vinylxylene, p-t-butylstyrene, ethylstyrene and the like. Among these, styrene and α-methylstyrene are preferable in terms of the fluidity of the thermoplastic resin composition, the color development of the molded product, especially the jet-blackness when colored black, and the impact resistance of the molded product. One of these aromatic vinyl monomers may be used alone, or two or more thereof may be used in combination.

Examples of vinyl cyanide monomers include acrylonitrile, methacrylonitrile, and the like. One of these vinyl cyanide monomers may be used alone, or two or more thereof may be used in combination.

Examples of other monomers include acrylic acid esters such as methyl acrylate, ethyl acrylate, propyl acrylate and butyl acrylate; methacrylic acid esters such as methyl methacrylate, ethyl methacrylate, propyl methacrylate and butyl methacrylate; and maleimide monomers such as N-cyclohexylmaleimide and N-phenylmaleimide. One of these other monomers may be used alone, or two or more thereof may be used in combination.

The proportions of the monomer components constituting the vinyl monomer mixture (m1) are not particularly limited, but the proportion of the aromatic vinyl monomer is preferably 65 to 82% by mass, more preferably 73 to 80% by mass, even more preferably 75 to 80% by mass, based on the total mass (100% by mass) of the vinyl monomer mixture (m1). When the proportion of the aromatic vinyl monomer is within the above range, the molded product shows further improved impact resistance and color development.

Further, the proportion of the vinyl cyanide monomer is preferably 18 to 35% by mass, more preferably 20 to 27% by mass, even more preferably 20 to 25% by mass, based on the total mass (100% by mass) of the vinyl monomer mixture (m1). When the proportion of the vinyl cyanide monomer is within the above range, the molded product shows further improved impact resistance and color development.

<Method for Producing Graft Copolymer (A)>

The graft copolymer (A) is obtained by polymerizing the vinyl monomer mixture (m1) in the presence of the alkyl (meth)acrylate rubbery polymer (a).

The method for performing the polymerization is not particularly limited, but an emulsion polymerization is preferable because the reaction can be controlled so as to proceed stably. Specific examples of the polymerization method include a method in which the vinyl monomer mixture (m1) is fed at once into a latex of the alkyl (meth)acrylate rubbery polymer (a) and then polymerized; a method in which a part of the vinyl monomer mixture (m1) is added to the latex of the alkyl (meth)acrylate rubbery polymer (a) in advance, and the rest of the vinyl monomer mixture (m1) is dropped onto the polymerization system while allowing the polymerization to proceed; a method in which the polymerization is implemented while dropping the entire amount of the vinyl monomer mixture (m1) onto the latex of the alkyl (meth)acrylate rubbery polymer (a). The polymerization may be carried out in a single stage or may be divided into two or more stages. When the polymerization is divided into two or more stages, it is also possible to change the types and proportions of monomers constituting the vinyl monomer mixture (m1) in the respective stages.

The emulsion polymerization is usually carried out using a radical polymerization initiator and an emulsifier. Examples of these radical polymerization initiators and emulsifiers include those radical polymerization initiators and emulsifiers which are listed above in the description of the method for producing the alkyl (meth)acrylate rubbery polymer (a). When implementing the polymerization, any of various known chain transfer agents may be added in order to control the molecular weight and graft ratio of the graft copolymer (A) to be obtained.

The polymerization conditions are preferably, for example, 30 to 95° C. for 1 to 10 hours.

The graft copolymer (A) obtained by the emulsification polymerization is usually in the form of a latex.

Examples of the method for recovering the graft copolymer (A) from the latex of the graft copolymer (A) include a wet method in which the latex of the graft copolymer (A) is put into hot water having a coagulant dissolved therein, thereby coagulating the latex into a slurry; and a spray-drying method in which the latex of the graft copolymer (A) is sprayed to a heated atmosphere, thereby semi-directly recovering the graft copolymer (A).

Examples of the coagulant used in the wet method include inorganic acids such as sulfuric acid, hydrochloric acid, phosphoric acid and nitric acid; and metal salts such as calcium chloride, calcium acetate and aluminum sulfate. The coagulant is selected taking the emulsifier used in the polymerization into consideration. For example, when only a carboxylic acid soap, such as a fatty acid soap or a rosinate soap, is used as the emulsifier, one or more of the coagulants described above can be used. When an emulsifier showing stable emulsifying effect even at a pH in the acidic range, such as sodium alkylbenzene sulfonate, is used as the emulsifier, a metal salt is suitable as the coagulant.

When the wet method is employed, a graft copolymer (A) in the form of a slurry is obtained.

Examples of the method for obtaining a dried graft copolymer (A) from a slurry of the graft copolymer (A) include a method in which, first, the residual emulsifier in the slurry is eluted into water and washed away, and then the slurry is dehydrated by centrifugation or dehydration with a dehydrator or the like, followed by drying with an air flow dryer or the like; and a method in which dehydration and drying are simultaneously implemented with a squeezing dehydrator or an extruder. By such methods, the dried graft copolymer (A) in the form of a powder or particles is obtained.

The washing conditions are not particularly limited, but the washing is preferably implemented under the conditions that reduce the residual emulsifier content to 0.3 to 2% by mass or less relative to 100% by mass of the dried graft copolymer (A). When the residual emulsifier content in the graft copolymer (A) is 0.3% by mass or more, the fluidity of the obtained graft copolymer (A) and the thermoplastic resin composition containing the same tends to improve further. On the other hand, when the residual emulsifier content in the graft copolymer (A) is 2% by mass or less, it is possible to suppress gas generation during high-temperature molding of the thermoplastic resin composition. The residual emulsifier content can be adjusted by, for example, washing time.

The drying temperature is, for example, preferably 50 to 90° C.

The volume average particle size and the volume-based particle size distribution of the alkyl (meth)acrylate rubbery polymer (a) in the obtained graft copolymer (A) are the same as the volume average particle size and volume-based particle size distribution of the alkyl (meth)acrylate rubbery polymer (a) in the latex of the alkyl (meth)acrylate rubbery polymer (a), which is used in the production of the graft copolymer (A).

It is also possible to send the graft copolymer (A) discharged from the squeezing dehydrator or the extruder directly, without recovering the graft copolymer (A), to an extruder or a molding machine for producing the resin composition to thereby obtain a molded product.

[Graft Copolymer (B)]

The graft copolymer (B) is a graft copolymer obtained by polymerizing a vinyl monomer mixture (m2) in the presence of an alkyl (meth)acrylate rubbery polymer (b).

With respect to the proportions of the alkyl (meth)acrylate rubbery polymer (b) and the vinyl monomer mixture (m2), it is preferable that the proportion of the alkyl (meth)acrylate rubbery polymer (b) is 20 to 80% by mass and the proportion of the vinyl monomer mixture (m2) is 20 to 80% by mass, and it is more preferable that the proportion of the alkyl (meth)acrylate rubbery polymer (b) is 30 to 70% by mass and the proportion of the vinyl monomer mixture (m2) is 30 to 70% by mass, with the proviso that a sum of amounts of the alkyl (meth)acrylate rubbery polymer (b) and the vinyl monomer mixture (m2) is 100% by mass. When the proportion of the alkyl (meth)acrylate rubbery polymer (b) is 20% by mass or more, the impact resistance of the molded product improves. When this proportion is 80% by mass or less, the color development of the molded product improves, and the fluidity of the thermoplastic resin composition tends to increase as well.

<Alkyl (Meth)Acrylate Rubbery Polymer (b)>

The alkyl (meth)acrylate rubbery polymer (b) is a polymer having alkyl (meth)acrylate monomer units and polyfunctional monomer units.

The alkyl (meth)acrylate rubbery polymer (b) may further has monomer (other monomer) units other than the alkyl (meth)acrylate monomer units and the polyfunctional monomer units.

The number of carbon atoms in the alkyl group in the alkyl (meth)acrylate monomer is, for example, preferably 1 to 20.

Examples of alkyl (meth)acrylate monomers include monofunctional monomers, and specific examples thereof include those alkyl (meth)acrylate monomers listed above in the description of the alkyl (meth)acrylate rubbery polymer (a).

The proportion of the alkyl (meth)acrylate monomer units in the alkyl (meth)acrylate rubbery polymer (b) is preferably 80 to 99.1% by mass, more preferably 90 to 99.1% by mass, based on the total mass of all monomer units constituting the alkyl (meth)acrylate rubbery polymer (b).

Examples of polyfunctional monomers include graft crossing agents and cross-linking agents, and specific examples thereof include those polyfunctional monomers listed above in the description of the alkyl (meth)acrylate rubbery polymer (a).

In the alkyl (meth)acrylate rubbery polymer (b), the amount of the polyfunctional monomer units relative to 100 parts by mass of the alkyl (meth)acrylate monomer units is 0.9 to 2.2 parts by mass (that is, 0.90 to 2.20 parts by mass), preferably 1.0 to 2.0 parts by mass (that is, 1.00 to 2.00 parts by mass), more preferably 1.0 to 1.6 parts by mass (that is, 1.00 to 1.60 parts by mass). When the amount of the polyfunctional monomer units is 0.9 parts by mass or more, the color development of the molded product improves. When this amount is 2.2 parts by mass or less, the impact resistance of the molded product improves.

In this context, the amount (ratio) described above is calculated as a ratio of the amount of the polyfunctional monomer units to the amount of the alkyl (meth)acrylate monomer units, but the figures obtained by this calculation are not rounded off. That is, for example, 0.899 is not to be rounded up to 0.9.

The other monomers are not particularly limited as long as they are copolymerizable with at least the alkyl (meth) acrylate monomers, and specific examples thereof include those other monomers listed above in the description of the alkyl (meth)acrylate rubbery polymer (a).

The alkyl (meth)acrylate rubbery polymer (b) is granular (particulate), and the alkyl (meth)acrylate rubbery polymer (b) forming a part of the graft copolymer (B) is present in the form of granules in the graft copolymer (B) as well as in the thermoplastic resin composition.

The volume average particle size of the alkyl (meth) acrylate rubbery polymer (b) is 130 to 200 nm, preferably 145 to 185 nm. When the volume average particle size of the alkyl (meth)acrylate rubbery polymer (b) is 130 nm or more, the impact resistance of the molded article improves. When the volume average particle size is 200 nm or less, the color development of the molded article improves.

In this context, the volume average particle size of the alkyl (meth)acrylate rubbery polymer (b) is a value calculated from a particle size distribution obtained by measuring the volume particle size distribution using a dynamic light scattering particle size distribution analyzer. The volume average particle size is a median diameter (d50).

Among all particles formed by the alkyl (meth)acrylate rubbery polymer (b), the proportion of particles having a particle size of 300 nm or more is preferably 10 to 30% by mass, more preferably 10 to 25% by mass, even more preferably 10 to 18% by mass, based on the total mass of the alkyl (meth)acrylate rubbery polymer (b). When the proportion is within this range, the proportion of particles having a particle diameter of 300 nm or more among all particles formed by the rubbery polymer contained in the thermoplastic resin composition can be easily adjusted to 1 to 11% by mass, as described in detail in a later section.

In terms of improvement of scratch resistance, the alkyl (meth)acrylate rubbery polymer (b) is preferably a rubbery polymer containing polyorganosiloxane (s).

The polyorganosiloxane (s) contained in the alkyl (meth) acrylate rubbery polymer (b) may be the same as or different from the polyorganosiloxane (s) listed above in the description of the alkyl (meth)acrylate polymer (a).

When the alkyl (meth)acrylate rubbery polymer (b) is a rubbery polymer containing the polyorganosiloxane (s), the proportion of the polyorganosiloxane (s) is preferably 5% by mass or more and less than 15% by mass, more preferably 5 to 10% by mass, based on the total mass of the alkyl (meth)acrylate rubbery polymer (b). When the proportion is within this range, the molded product is more improved in terms of impact resistance, falling ball impact resistance under low temperature environments, color development, and scratch resistance.

(Method for Producing Alkyl (Meth)Acrylate Rubbery Polymer (b))

The alkyl (meth)acrylate rubbery polymer (b) can be obtained, for example, by polymerizing a monomer component (β) containing 0.9 to 2.2 parts by mass of a polyfunctional monomer with respect to 100 parts by mass of the alkyl (meth)acrylate monomer. This monomer component (β) may contain other monomers. The polymerization method is not particularly limited, and the polymerization can be carried out according to known methods.

For obtaining a rubbery polymer containing polyorganosiloxane, examples of polymerization methods include a method in which a plurality of latexes respectively containing the polyorganosiloxane (s) and the alkyl (meth)acrylate rubbery polymer (b) are heteroaggregated or co-enlarged, and a method in which, in the presence of a latex containing either one of the polyorganosiloxane (s) and the alkyl (meth)acrylate rubbery polymer (b), a monomer component for forming the other one of the polymers is polymerized to foam a composite polymers. Since the volume average particle size of the composite rubbery polymer can be easily adjusted to fall within the above range, it is preferable to employ a method including a step (radical polymerization step) of radically polymerizing the monomer component (β) in the presence of a latex of polyorganosiloxane (sl), to thereby obtain a copolymer latex, and a step (enlarging step) of mixing the copolymer latex and the acid group-containing copolymer latex, thereby enlarging the copolymer latex. This method preferably further includes a step (condensed acid salt addition step) of adding a condensed acid salt to the copolymer latex after the radical polymerization step and before the enlarging step.

Radical Polymerization Step:

The radical polymerization step is a step of radically polymerizing the monomer component (β).

The radical polymerization step can be carried out in the same manner as the radical polymerization step described above in the explanation of the method for producing the alkyl (meth)acrylate rubbery polymer (a).

Condensed Acid Salt Addition Step:

The condensed acid salt addition step is a step of adding a condensed acid salt to the copolymer latex obtained in the radical polymerization step. The addition of the condensed acid salt to the copolymer latex prior to the enlarging step facilitates the enlarging so that the amount of the acid group-containing copolymer latex added can be reduced. As a result, it becomes easy to adjust the volume average particle size and particle size distribution of the alkyl (meth)acrylate rubbery polymer (b) to fall within the respective ranges described above.

As the condensed acid salt, for example, salts of condensed acids such as condensed phosphoric acid and condensed silicic acid with at least one of alkali metals and alkaline earth metals can be used. Among these, salts of pyrophosphoric acid, which is a condensed phosphoric acid, with alkali metals are preferred, and sodium pyrophosphate or potassium pyrophosphate is particularly preferred.

The amount of the condensed acid salt to be added may be adjusted so that the volume average particle size and particle size distribution of the alkyl (meth)acrylate rubbery polymer (b) fall within the respective ranges described above, and is preferably 0.1 to 5 parts by mass, more preferably 0.3 to 3 parts by mass, with respect to 100 parts by mass of the solid content of the copolymer latex obtained in the radical polymerization step. When the amount of the condensed acid salt to be added is 0.1 parts by mass or more, the enlargement sufficiently proceeds. When the amount is 5 parts by mass or less, the enlargement sufficiently proceeds, or the rubber latex is likely to be stabilized so that it is possible to suppress formation of a large amount of agglomerates.

The condensed acid salt is preferably added to the copolymer latex all at once.

The pH at 25° C. of the copolymer latex to which the condensed acid salt has been added (i.e., a mixture of the copolymer latex and the condensed acid salt) is preferably 7 or higher. When the pH is 7 or higher, the enlargement tends to proceed sufficiently. For adjusting the pH to 7 or higher, common alkaline compounds such as sodium hydroxide and potassium hydroxide can be used.

Enlarging Step:

The enlarging step is a step of mixing the copolymer latex obtained in the radical polymerization step, to which the condensed acid salt is optionally added in the condensed acid salt addition step, with the acid group-containing copolymer latex, thereby enlarging the copolymer latex. As a result, a latex of the alkyl (meth)acrylate rubbery polymer (b) enlarged to a predetermined particle size is obtained.

The acid group-containing copolymer has acid group-containing monomer units and alkyl (meth)acrylate monomer units. If necessary, the acid group-containing copolymer may further include monomer units other than those mentioned above.

The acid group-containing monomer is preferably a carboxy group-containing unsaturated compound. Examples of carboxy group-containing unsaturated compounds include (meth)acrylic acid, itaconic acid, crotonic acid, etc., of which (meth)acrylic acid is particularly preferred. One of these acid group-containing monomers may be used alone, or two or more thereof may be used in combination.

Examples of alkyl (meth)acrylate monomers include esters of (meth)acrylic acid with alcohols having a linear or branched alkyl group having 1 to 12 carbon atoms, such as methyl acrylate, ethyl acrylate, n-propyl acrylate, i-propyl acrylate, n-butyl acrylate, isobutyl acrylate, t-butyl acrylate, 2-ethylhexyl acrylate, methyl methacrylate, ethyl methacrylate, n-propyl methacrylate, i-propyl methacrylate, n-butyl methacrylate, isobutyl methacrylate, t-butyl methacrylate, 2-ethylhexyl methacrylate and the like. Among these, alkyl (meth)acrylates having an alkyl group having 1 to 8 carbon atoms are particularly preferred. One of these alkyl (meth)acrylates may be used alone, or two or more of these may be used in combination.

The other monomers are monomers copolymerizable with the acid group-containing monomers and the alkyl (meth)acrylate monomers, and are monomers other than the acid group-containing monomers and the alkyl (meth)acrylate monomers. Examples of such other monomers include aromatic vinyl monomers (e.g., styrene, α-methylstyrene, p-methylstyrene, etc.), vinyl cyanide monomers (e.g., acrylonitrile, methacrylonitrile, etc.), monomers having two or more polymerizable functional groups (e.g., allyl methacrylate, polyethylene glycol dimethacrylate, triallyl cyanurate, triallyl isocyanurate, triallyl trimellitate, etc.). One of these other monomers may be used alone, or two or more thereof may be used in combination.

The acid group-containing copolymer is preferably a copolymer in which the proportion of the acid group-containing monomer unit is 5 to 40% by mass, the proportion of the alkyl (meth)acrylate monomer unit is 60 to 95% by mass, and the proportion of the other monomer units is 0 to 48% by mass, based on the total mass (100% by mass) of all the monomer units constituting the acid group-containing copolymer, more preferably a copolymer in which the proportion of the acid group-containing monomer unit is 8 to 30% by mass, the proportion of the alkyl (meth)acrylate monomer unit is 70 to 92% by mass, and the proportion of the other monomer units is 0 to 30% by mass. When the proportion of the acid group-containing monomeric unit is 5% by mass or more and the proportion of the alkyl (meth)acrylate monomeric unit is 95% by mass or less, a sufficient enlarging ability can be obtained. When the proportion of the acid group-containing monomer unit is 40% by mass or less and the proportion of the alkyl (meth)acrylate monomer unit is 60% by mass or more, it becomes possible to suppress the formation of a large amount of agglomerates during the production of the acid group-containing copolymer latex. When the proportion of the other monomer units is 48% by mass or less, it becomes possible to impart the acid group-containing copolymer latex with a sufficient enlarging ability.

The acid group-containing copolymer latex is obtained by polymerizing a monomer component (γ) containing an acid group-containing monomer, an alkyl (meth)acrylate monomer and, if necessary, other monomers copolymerizable therewith in water. As the polymerization method, a general emulsion polymerization method can be used.

Examples of emulsifiers used in emulsion polymerization include known emulsifiers, e.g., carboxylic acid emulsifiers such as oleic acid, palmitic acid, stearic acid, alkali metal salts of rosin acid, and alkali metal salts of an alkenylsuccinic acid; and anionic emulsifiers such as an alkyl sulfate, a sodium alkylbenzene sulfonate, a sodium alkyl sulfosuccinate, and sodium polyoxyethylene nonylphenyl ether sulfate. One of these emulsifiers may be used alone, or two or more of these may be used in combination.

The emulsifier may be added all at once at the initial stage of polymerization, or may be added continuously or intermittently. Depending on the amount of emulsifier and the method of its use, the emulsifier may affect the particle size of the acid group-containing copolymer latex and even the particle size of the enlarged alkyl (meth)acrylate rubbery polymer (b) latex. Therefore, it is preferable to select the appropriate amount and method of use of the emulsifier.

Examples of polymerization initiators used for emulsion polymerization include thermal decomposition initiators and redox initiators. Examples of thermal decomposition initiators include potassium persulfate, sodium persulfate, ammonium persulfate, and the like. Examples of redox initiators include a combination of an organic peroxide represented by cumene hydroperoxide, sodium formaldehyde sulfoxylate, and an iron salt. One of these polymerization initiators may be used alone, or two or more of these may be used in combination.

In the emulsion polymerization, a chain transfer agent, such as a mercaptan (e.g., t-dodecylmercaptan, n-octylmercaptan, etc.), terpinolene, or α-methylstyrene dimer, may be used to adjust the molecular weight. Also, at least one of an alkali and an acid may be added to adjust pH, and an electrolyte may be added as a viscosity reducer.

The amount of the acid group-containing copolymer latex added in the enlarging step (in terms of solid content) may be adjusted so that the volume average particle size and particle size distribution of the alkyl (meth)acrylate rubbery polymer (b) fall within the respective ranges described above, and is preferably 0.1 to 5 parts by mass, more preferably 0.3 to 3 parts by mass, with respect to 100 parts by mass of the solid content of the copolymer latex obtained in the radical polymerization step. When the addition amount of the acid group-containing copolymer latex is 0.1 part by mass of more, the enlargement proceeds sufficiently. In addition, it is possible to suppress the generation of a large amount of agglomerates. On the other hand, when the addition amount of the acid group-containing copolymer latex is 5 parts by mass or less, it is possible to suppress the lowering of pH of the enlarged latex, and the latex is less likely to become unstable.

The acid group-containing copolymer latex may be added all at once to the copolymer latex, or may be added dropwise continuously or intermittently.

It is preferable to moderately control the stirring during enlargement. Insufficient stirring may result in the local enlargement of the rubbery polymer, leaving part of the rubbery polymer unenlarged. On the other hand, excessive stirring may destabilize the enlarged latex and generate a large amount of agglomeration.

The temperature for enlarging is not particularly limited, but is preferably 20 to 90° C., more preferably 30 to 80° C. When the temperature is outside this range, the enlargement may not proceed sufficiently.

The alkyl (meth)acrylate rubbery polymer (b) may be produced by further adding and polymerizing the monomer component (β) after enlargement using the acid group-containing copolymer latex as described above.

(Vinyl Monomer Mixture (m2))

With respect to the vinyl monomer mixture (m2), there is no particular limitation as long as it includes at least one type of vinyl monomer, but the vinyl monomer mixture (m2) is preferably a monomer mixture including an aromatic vinyl monomer and a vinyl cyanide monomer. Further, the vinyl monomer mixture (m2) may include other monomers copolymerizable with the aromatic vinyl monomer and the vinyl cyanide monomer as long as the effects of the present invention are not impaired.

Examples of the aromatic vinyl monomer include those aromatic vinyl monomers listed above in the description of the vinyl monomer mixture (m1).

Examples of the vinyl cyanide monomer include those vinyl cyanide monomers listed above in the description of the vinyl monomer mixture (m1).

Examples of the other monomers include those listed above in the description of the vinyl monomer mixture (m1).

The proportions of the monomer components constituting the vinyl monomer mixture (m2) are not particularly limited, but the proportion of the aromatic vinyl monomer is preferably 65 to 82% by mass, more preferably 73 to 80% by mass, even more preferably 75 to 80% by mass, based on the total mass (100% by mass) of the vinyl monomer mixture (m2). When the proportion of the aromatic vinyl monomer is within the above range, the molded product shows further improved impact resistance and color development.

Further, the proportion of the vinyl cyanide monomer is preferably 18 to 35% by mass, more preferably 20 to 27% by mass, even more preferably 20 to 25% by mass, based on the total mass (100% by mass) of the vinyl monomer mixture (m2). When the proportion of the vinyl cyanide monomer is within the above range, the molded product shows further improved impact resistance and color development.

<Method for Producing Graft Copolymer (B)>

The graft copolymer (B) is obtained by polymerizing the vinyl monomer mixture (m2) in the presence of the alkyl (meth)acrylate rubbery polymer (b).

The method for producing the graft copolymer (B) may be the same as the method for producing the graft copolymer (A).

[Vinyl Copolymer (C)]

The vinyl copolymer (C) is a copolymer obtained by polymerizing the vinyl monomer mixture (m3).

The vinyl copolymer (C) contains at least alkyl (meth) acrylate monomer units.

The proportion of the alkyl (meth)acrylate monomer units with respect to the total mass of all monomer units constituting the vinyl copolymer (C) can be regarded as the same as the proportion of the alkyl (meth)acrylate monomers with respect to the total mass of the vinyl monomer mixture (m3). The same applies to units other than alkyl (meth)acrylate monomer units.

The mass average molecular weight (Mw) of the vinyl copolymer (C) is, for example, preferably 5,000 to 500,000.

The mass average molecular weight of the vinyl copolymer (C) is a standard polystyrene-equivalent value measured by gel permeation chromatography (GPC).

As the vinyl copolymer (C), one type of the polymer may be used alone, or two or more types of the polymer may be used in combination.

<Vinyl Monomer Mixture (m3)>

The vinyl monomer mixture (m3) contains at least an alkyl (meth)acrylate monomer, and is preferably a monomer mixture containing an alkyl (meth)acrylate monomer and an aromatic vinyl monomer. Further, the vinyl monomer mixture (m3) may include other monomers copolymerizable with the alkyl (meth)acrylate monomer and the aromatic vinyl monomer as long as the effects of the present invention are not impaired.

Examples of alkyl (meth)acrylate monomers include methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate, methyl acrylate, ethyl acrylate, propyl acrylate, butyl acrylate, and the like. Preferred examples of the alkyl (meth) acrylate monomers include alkyl (meth) acrylate monomers with a hydrocarbon group having 1 to 8 carbon atoms, among which methyl methacrylate and ethyl methacrylate are particularly preferable in terms of further improved heat resistance and impact resistance of the molded product. One of these alkyl (meth) acrylate monomers may be used alone, or two or more thereof may be used in combination.

Examples of the aromatic vinyl monomer include those aromatic vinyl monomers listed above in the description of the vinyl monomer mixture (m1).

Examples of other monomers include a vinyl cyanide monomer and a maleimide monomer.

Examples of the vinyl cyanide monomer include those vinyl cyanide monomers listed above in the description of the vinyl monomer mixture (m1).

Examples of maleimide monomers include N-alkylmaleimides (N-methylmaleimide, N-ethylmaleimide, N-n-propylmaleimide, N-i-propylmaleimide, N-n-butylmaleimide, N-i-butylmaleimide, N-t-butylmaleimide, etc.), N-cycloalkylmaleimide (N-cyclohexylmaleimide, etc.), N-arylmaleimide (N-phenylmaleimide, N-alkyl-substituted phenylmaleimide, N-chlorophenylmaleimide, etc.), and the like.

Maleimide monomers are preferable as the other monomers, and N-phenylmaleimide is more preferable, in terms of further improved heat resistance of the molded product.

One of these other monomers may be used alone, or two or more thereof may be used in combination.

The proportions of the monomer components constituting the vinyl monomer mixture (m3) is not particularly limited, but the proportion of the alkyl (meth)acrylate monomer is preferably 50 to 99% by mass, the proportion of the aromatic vinyl monomer is preferably 1 to 50% by mass, and the proportion of the other monomers is preferably 0 to 49% by mass, based on the total mass (100% by mass) of the vinyl monomer mixture (m3), in terms of further improvement of impact resistance of the molded product, especially falling ball impact resistance under low temperature environments, and color development. Further, the sum of the amounts of the alkyl (meth)acrylate monomer, the aromatic vinyl monomer, and the other monomers is preferably 100% by mass with respect to the total mass of the vinyl monomer mixture (m3).

When the vinyl monomer mixture (m3) contains a maleimide monomer, the proportion of the maleimide monomer is preferably 5 to 49% by mass, based on the total mass (100% by mass) of the vinyl monomer mixture (m3), in terms of heat resistance and scratch resistance of the molded product.

<Method for Producing Vinyl Copolymer (C)>

The vinyl copolymer (C) is obtained by polymerizing the vinyl monomer mixture (m3). The polymerization method for the vinyl monomer mixture (m3) is not limited. Examples of the polymerization method include known polymerization methods, such as an emulsion polymerization method, a suspension polymerization method, and a solution polymerization method.

When the vinyl monomer mixture (m3) contains two or more types of monomers, the resulting vinyl copolymer (C) is typically a random copolymer in which units derived from these two or more types of monomers are randomly arranged.

For producing the vinyl copolymer (C) by the emulsion polymerization method, for example, the production can be implemented by a method in which the vinyl monomer mixture (m3), an emulsifier, a polymerization initiator and a chain transfer agent are fed into a reactor and heated to perform polymerization, thereby obtaining an aqueous dispersion containing the vinyl copolymer (C), and the vinyl copolymer (A) is recovered from the aqueous dispersion by a precipitation method.

The polymerization conditions for the emulsion polymerization are preferably, for example, 30 to 95° C. for 1 to 10 hours.

Examples of emulsifiers include ordinary emulsifiers for emulsion polymerization (potassium rosinate, a sodium alkylbenzene sulfonate, etc.).

Examples of polymerization initiators include organic and inorganic oxide initiators.

Examples of chain transfer agents include mercaptans, α-methylstyrene dimer, terpenes, and the like.

As for the precipitation method, the same method as used for recovering the graft copolymer (A) from the latex of the graft copolymer (A) can be employed.

For producing the vinyl copolymer (C) by the suspension polymerization method, for example, the production can be implemented by a method in which the vinyl monomer mixture (m3), a dispersant, a dispersion aid, a polymerization initiator and a chain transfer agent are fed into a reactor and heated to perform polymerization, followed by dehydrating and drying the resulting slurry, to thereby recover the vinyl copolymer (C).

The polymerization conditions for the suspension polymerization are preferably, for example, at 60 to 150° C. and for 1 to 20 hours.

Examples of dispersants include tricalcium phosphite, polyvinyl alcohol, and the like.

Examples of dispersion aids include a sodium alkylbenzenesulfonate, and the like.

Examples of polymerization initiators include organic peroxides, and the like.

Examples of chain transfer agents include mercaptans, α-methylstyrene dimer, terpenes, and the like.

"Proportions of Components"

The proportion of the alkyl (meth)acrylate rubbery polymer (a) is preferably 30 to 90% by mass, particularly preferably 40 to 80% by mass, provided that the sum of amounts of the alkyl (meth)acrylate rubbery polymer (a) in the graft copolymer (A) and the alkyl (meth)acrylate rubbery polymer (b) in the graft copolymer (B) is 100% by mass.

The proportion of the alkyl (meth)acrylate rubbery polymer (b) is preferably 10 to 70% by mass, particularly preferably 20 to 60% by mass, provided that the sum of amounts of the alkyl (meth)acrylate rubbery polymer (a) in the graft copolymer (A) and the alkyl (meth)acrylate rubbery polymer (b) in the graft copolymer (B) is 100% by mass.

That is, the mass ratio (a:b) of the alkyl (meth)acrylate rubbery polymer (a) in the graft copolymer (A) to the alkyl (meth)acrylate rubbery polymer (b) in the graft copolymer (B) is preferably from 30:70 to 90:10, particularly preferably from 40:60 to 80:20.

When the proportions of the alkyl (meth)acrylate rubbery polymer (a) in the graft copolymer (A) and the alkyl (meth)acrylate rubbery polymer (b) in the graft copolymer (B) are within the above ranges, excellent impact resistance can be achieved with less rubber content, and excellent scratch resistance and color development can also be achieved. In addition, the fluidity of the thermoplastic resin composition improves.

The proportion of the rubbery polymer contained in the thermoplastic resin composition (rubber content) is preferably 21 to 28% by mass, more preferably 22 to 25% by mass, based on the total mass (100% by mass) of the thermoplastic resin composition. When the rubber content is 21% by mass or more, the molded product improves in terms of impact resistance, falling ball impact resistance under low temperature environments, and scratch resistance. When the rubber content is 28% by mass or less, the color development of the molded product improves, and the fluidity of the thermoplastic resin composition tends to improve as well.

In the present invention, the "rubbery polymer contained in the thermoplastic resin composition" indicates components derived from the alkyl (meth)acrylate rubbery polymer (a) in the graft copolymer (A), and the alkyl (meth)acrylate rubbery polymer (b) in the graft copolymer (B).

The sum of amounts of the graft copolymer (A) and the graft copolymer (B) is preferably 25 to 55% by mass, more preferably 30 to 50% by mass, provided that the sum of amounts of the graft copolymer (A), the graft copolymer (B) and the vinyl copolymer (C) is 100% by mass. When the sum of amounts of the graft copolymer (A) and the graft copolymer (B) is within the above range, it is possible to improve balance of properties such as fluidity of the thermoplastic resin composition, scratch resistance, impact resistance, color development, and heat resistance.

The amount of the vinyl copolymer (C) is preferably 45 to 75% by mass, more preferably 50 to 70% by mass, provided that the sum of amounts of the graft copolymer (A), the graft copolymer (B) and the vinyl copolymer (C) is 100% by mass. When the amount of the vinyl copolymer (C) is within the above range, it is possible to improve balance of properties such as fluidity of the thermoplastic resin composition, scratch resistance, impact resistance, color development, and heat resistance.

The proportion of particles with a particle size of 300 nm or more among all particles formed by the rubbery polymer contained in the thermoplastic resin composition is 1 to 11% by mass, preferably 3 to 10% by mass, based on the total mass (100% by mass) of the all particles formed by the rubbery polymer. When the proportion of particles with a particle size of 300 nm or more among the all particles formed by the rubbery polymer is 1% by mass or more, the impact resistance of the molded product improves. When the proportion is 11% by mass or less, the color development of the molded product improves.

As described above, the thermoplastic resin composition includes the resin component including the copolymer (A), the graft copolymer (B) and the vinyl copolymer (C). The resin component may consist only of the copolymer (A), the graft copolymer (B) and the vinyl copolymer (C), or may further include the other thermoplastic resin (D) described below as necessary. The resin component preferably consists only of the copolymer (A), the graft copolymer (B) and the vinyl copolymer (C).

The proportion of the resin component is preferably more than 50% by mass, more preferably 70% by mass or more, even more preferably 90% by mass or more, based on the total mass of the thermoplastic resin composition. The proportion of the resin component may be 100% by mass, based on the total mass of the thermoplastic resin composition. That is, the proportion of the resin component is preferably more than 50% by mass and 100% by mass or less, more preferably 70 to 100% by mass, even more preferably 90 to 100% by mass, based on the total mass of the thermoplastic resin composition.

When the thermoplastic resin composition contains an optional component (E) described below, the proportion of the resin component is preferably more than 50% by mass and less than 100% by mass, more preferably 70 to 99.5% by mass, even more preferably 80 to 99% by mass, particularly preferably 90 to 98.5% by mass, most preferably 95 to 98% by mass.

"Other Thermoplastic Resin (D)"

The thermoplastic resin composition of the first aspect of the present invention may contain other thermoplastic resin (D) as far as the effects of the present invention are not impaired.

Examples of other thermoplastic resins (D) include polycarbonate, polybutylene terephthalate (PBT), polyethylene terephthalate (PET), polyvinyl chloride, polystyrene, polyacetal, a modified polyphenylene ether (modified PPE), an ethylene-vinyl acetate copolymer, polyarylate, a liquid crystalline polyester, polyethylene, polypropylene, fluororesin, polyamide (nylon), and the like.

"Optional Component (E)"

The thermoplastic resin composition of the first aspect of the present invention may contain an optional component (E) other than the resin component as far as the effects of the present invention are not impaired.

Examples of the optional component (E) include additives such as antioxidants, lubricants, processing aids, colorants (pigments, dyes, etc.), fillers, silicone oils, paraffin oils, UV absorbers, and light stabilizers.

The thermoplastic resin composition of the first aspect of the present invention is excellent in color development. Particularly, in terms of jet-blackness when the molded product is to be colored black, it is preferable for the resin composition to contain carbon black as a coloring agent, more preferably a carbon black masterbatch for improved dispersibility. The amount of the carbon black (in terms of actual carbon black content for a carbon black masterbatch) is preferably 0.1 to 5 parts by mass, with respect to 100 parts by mass in total of the graft copolymer (A), the graft copolymer (B), the vinyl copolymer (C). When the amount of the carbon black is 0.1 parts by mass or more, the molded product improves further in terms of weatherability as well as jet blackness. When the amount is 5 parts by mass or less, the impact resistance of the molded product improves further.

Carbon black to be used is not particularly limited, but carbon black having an average primary particle size of 10 to 20 nm is preferred. When the average primary particle size is 10 nm or more, aggregation of carbon black in the thermoplastic resin is suppressed, and it becomes easier to achieve sufficient jet blackness. In addition, it is difficult to produce carbon black with an average primary particle size of less than 10 nm, which therefore is inferior in industrial feasibility. When the average primary particle size is 20 nm or less, it is possible to achieve excellent jet blackness of a black-colored molded product.

In this context, the average primary particle size of carbon black can be determined by a measuring method according to JIS K 6221. Alternatively, a catalog value, if any, may simply be adopted as the average primary particle size.

As the carbon black, commercial products can be used, and examples thereof include ROYAL BLACK 919P (manufactured by Koshigava Kasei Co., Ltd.); Mitsubishi Carbon Black (registered trademark) #2600, #2300, #1000, #980, #970, #960, #950, and #44 (each manufactured by Mitsubishi Chemical Corporation); Toka Black (registered trademark) #8500, and #8300 (each manufactured by Tokai Carbon Co., Ltd.), and the like. However, the carbon black is not limited to these examples.

(Method for Producing Carbon Black Masterbatch)

When a carbon black masterbatch is used, the carbon black masterbatch can be obtained, for example, by melt-kneading carbon black with the vinyl copolymer (C).

The melt-kneading method is not particularly limited, but for example, a carbon black masterbatch can be produced by mixing and dispersing carbon black, the vinyl copolymer (C), and, if necessary, the optional component (E) other than carbon black with a V-type blender, a Henschel mixer or the like, and melt-kneading the resulting mixture using a melt-kneader such as a screw extruder, a Banbury mixer, a pressure kneader, or mixing rolls. After melt-kneading, if necessary, the melt-kneaded product may be pelletized using a pelletizer or the like.

"Method for Producing Thermoplastic Resin Composition"

The method for producing the thermoplastic resin composition is not particularly limited. For example, the thermoplastic resin composition can be produced by mixing and dispersing the graft copolymer (A), the graft copolymer (B), the vinyl copolymer (C), and optionally the other thermoplastic resin (D) and the optional component (E) with a V-type blender, a Henschel mixer or the like, and melt-kneading the resulting mixture using a melt-kneader such as a screw extruder, a Banbury mixer, a pressure kneader, or mixing rolls. After melt-kneading, the melt-kneaded product may be pelletized using a pelletizer or the like, if necessary.

Technical Effect

As described above, the thermoplastic resin composition of the first aspect of the present invention described above includes: the graft copolymer (A) obtained by polymerizing the vinyl monomer mixture (m1) in the presence of an alkyl (meth)acrylate rubbery polymer (a) having a volume average particle diameter in a specific range and containing polyfunctional monomer units in a specific proportion; the graft copolymer (B) obtained by polymerizing the vinyl monomer mixture (m2) in the presence of an alkyl (meth) acrylate rubbery polymer (b) having a volume average particle size in a specific range and containing polyfunctional monomer units in a specific proportion; and the vinyl copolymer (C) which is a polymer of the vinyl monomer mixture (m3), in which particles with a particle size of 300 nm or more are present in a specific proportion relative to all particles formed by the rubbery polymer. Due to these features, the composition can provide a molded product excellent in impact resistance, falling ball impact resistance under low temperature environments (e.g., −30 to 0° C.) and color development.

When the thermoplastic resin composition contains carbon black or a carbon black masterbatch, superior weatherability and jet blackness of the molded product can be achieved as compared to the case where other colorants are used.

In particular, when at least one of the alkyl (meth)acrylate rubbery polymer (a) and the alkyl (meth)acrylate rubbery polymer (b) is a rubbery polymer containing polyorganosiloxane (s), it becomes possible to obtain a molded product having excellent scratch resistance as well as excellent impact resistance and color development.

Further, when the vinyl monomer mixture (m3) contains 50 to 99% by mass of the alkyl (meth)acrylate monomer, 1 to 50% by mass of the aromatic vinyl monomer, and 0 to 49% by mass of the vinyl monomer copolymerizable therewith, the molded product improves further in terms of impact resistance, falling ball impact resistance under low temperature environments, and color development.

Furthermore, when the proportion of the alkyl (meth) acrylate rubbery polymer (a) is 30 to 90% by mass, and the proportion of the alkyl (meth)acrylate rubbery polymer (b) is 70 to 10% by mass, provided that the sum of amounts of the alkyl (meth)acrylate rubbery polymer (a) and the alkyl (meth)acrylate rubbery polymer (b) is 100% by mass, excellent impact resistance can be achieved with less rubber content, and excellent scratch resistance and color development can also be achieved. In addition, the fluidity of the thermoplastic resin composition improves.

When the vinyl monomer mixture (m3) contains a maleimide monomer, the heat resistance of the molded product also improves without compromising the impact resistance of the molded product.

[Molded Product]

The molded product of the second aspect of the present invention is obtained by molding the thermoplastic resin composition of the first aspect of the invention by a known molding method.

Examples of molding methods include an injection molding method, a press molding method, an extrusion molding method, a vacuum molding method, a blow molding method, and the like.

Examples of applications of the molded product include vehicle exterior parts, office equipment, home appliances, building materials, and the like. Among these, vehicle exterior parts are preferred.

Since the molded product of the second aspect of the present invention uses the thermoplastic resin composition of the first aspect of the present invention, the molded product is excellent in impact resistance, falling ball impact resistance under low temperature environments, and color development.

When the thermoplastic resin composition contains carbon black or a carbon black masterbatch, superior weatherability and jet blackness can be achieved as compared to the case where other colorants are used.

EXAMPLES

Hereinbelow, the present invention is specifically described by way of Examples which should not be construed as limiting the present invention.

In the following description, the unit "%" refers to "% by mass" and the unit "parts" refers to "parts by weight", unless otherwise specified.

The various measurements and evaluations were performed in the Examples and Comparative Examples by respective methods as described below.

Measurement and Evaluation Methods

<Method for Measuring Particle Size Distribution and Volume Average Particle Size of Alkyl (Meth)Acrylate Rubbery Polymer>

Using Microtrac (product name "Nanotrac 150" manufactured by Nikkiso Co., Ltd.) and pure water as the measurement solvent, the volume-based particle size distribution of the alkyl (meth)acrylate rubbery polymer dispersed in the latex was measured, from which the volume average particle size (MV) and the proportion of particles with the specific particle size to all the particles were determined.

Through image processing of electron micrographs taken when the graft copolymer (A) or the graft copolymer (B) was mixed with the vinyl copolymer (C), it had been confirmed that the volume average particle sizes of the alkyl (meth)acrylate rubbery polymer (a) dispersed in the latex and the alkyl (meth)acrylate rubbery polymer (b) dispersed in the latex as such can be taken as the volume average particle sizes of the alkyl (meth)acrylate rubbery polymer (a) and the alkyl (meth)acrylate rubbery polymer (b), each present in the thermoplastic resin composition.

<Method for Measuring Mass Average Molecular Weight (Mw)>

Using GPC (GPC: product name "HLC8220" manufactured by Tosoh Corporation, column: product name "TSK GEl Super HZM-H" manufactured by Tosoh Corporation) and tetrahydrofuran (40° C.) as a solvent, the polystyrene-equivalent mass average molecular weight (Mw) was calculated.

<Evaluation of Impact Resistance: Charpy Impact Test>

Pellets of the thermoplastic resin composition are molded using a 55-ton injection molding machine (product name "IS55FP-1.5A" manufactured by Shibaura Machine Co., Ltd.) under the conditions of a cylinder temperature set at 220 to 260° C. and a mold temperature of 60° C. thereby obtaining a test piece (molded product) for the Charpy impact test.

The test piece was subjected to a Charpy impact test (notched) at 23° C. in accordance with the ISO 179 standard to measure the Charpy impact strength.

<Falling Ball Impact Resistance Under Low Temperature Environment>

Using a 75-ton injection molding machine (product name "J-75EII-P", manufactured by The Japan Steel Works, Ltd.), pellets of the thermoplastic resin composition were molded at a cylinder temperature of 220 to 260° C. and a mold temperature of 60° C. to obtain a black colored plate (mold polishing #5000) of 100 mm in length, 100 mm in width and 3 mm in thickness (hereinafter referred to as "molded product (Ma)"). The carbon black content in all of the thermoplastic resin compositions of the Examples and Comparative Examples to be described later was 1.0 part per 100 parts in total of the graft copolymer (A), the graft copolymer (B), and the vinyl copolymer (C).

After allowing the molded product (Ma) to stand in a low-temperature constant temperature bath adjusted to −30° C. for 4 hours or more, a 500 g iron ball was allowed to free-fall from a predetermined height to the central region of the molded product (Ma), and the maximum height (cm) at which the molded product (Ma) did not crack was measured.

<Evaluation of Color Development>

For the same molded product (Ma) as used for the measurement of falling ball impact resistance under low temperature environments, the lightness L* was measured by the SCE method, using an ultraviolet visible near infrared spectrophotometer (product name "V-670" manufactured by JASCO Corporation). A lower value of L* means a higher blackness, i.e., a superior color development (jet-blackness).

<Evaluation of Scratch Resistance>

With respect to the same molded article (Ma) as used for the measurement of the falling ball impact resistance under the low-temperature environment, the scratch resistance was evaluated as follows.

As shown in FIG. 1, a rod-shaped jig 10 having a tip portion 11 with a cross section of 20 mm×20 mm was prepared, and a piece 12 of Kanakin No. 3 (cotton cloth) cut out with a width of 20 mm was fixed to the tip portion 11. The tip portion 11 to which the piece 12 of Kanakin No. 3 was fixed was brought into contact with the surface of the molded product (Ma) 13 so that the rod-shaped jig 10 was perpendicular to the surface of the molded product (Ma) 13, and the tip portion 11 was placed on the surface of the molded product (Ma) and slid horizontally (in the direction of the double arrow in the FIGURE) on the surface, where the tip portion 11 was reciprocated 5 times. In this process, the applied load was 500 g (4.9 N). After reciprocating 5 times, the lightness L of the surface of the scratched molded product (Mc) was measured using a multi-angle colorimeter with an incident angle of 45° and an acceptance angle of 25°. The thus measured L* is referred to as "$L^*_{25}(c)$".

(Method for Evaluating Scratch Resistance)

An index $\Delta L^*_{25}$ (c-a) for conspicuousness of scratches on the molded product (Mc) was calculated from the following formula (1). The smaller the absolute value of $\Delta L^*_{25}$(c-a), the less conspicuous the scratch. In addition, $L^*_{25}$ (a) is a value of the surface brightness L of the molded product (Ma) before being scratched, measured using a multi-angle colorimeter with an incident angle of 45° and an acceptance angle of 25°.

$$\Delta L^*_{25}(ca)=L^*_{25}(c)-L^*_{25}(a) \tag{1}$$

When the absolute value of $\Delta L^*_{25}$(c-a) is 0.7 or less, scratches are inconspicuous and the design of the molded product is not impaired.

When the absolute value of $\Delta L^*_{25}$(c-a) is more than 0.7 and 1.0 or less, scratches are not very conspicuous and the design of the molded product is not impaired.

When the absolute value of $\Delta L^*_{25}$ (c-a) exceeds 1.0, scratches are conspicuous and the design of the molded product is impaired.

<Evaluation of Fluidity: Melt Volume Rate>

The melt volume rate (cm³/10 min) was measured at 230° C. and 98 N in accordance with ISO 1133.

<Evaluation of Heat Resistance>

A heat deflection temperature (° C.) was measured by the flatwise method at 1.80 MPa and 4 mm in accordance with ISO 75.

[Production of Components]

<Polyorganosiloxane (s)>

(Production of Polyorganosiloxane (s-1))

98 parts of octamethylcyclotetrasiloxane and 2 parts of γ-methacryloyloxypropyldimethoxymethylsilane were mixed to obtain 100 parts of a siloxane mixture. An aqueous solution of 0.67 parts of sodium dodecylbenzenesulfonate and 300 parts of ion-exchanged water was added to the siloxane mixture. The resulting was stirred for 2 minutes at 10,000 rpm with a homomixer, and was then passed through a homogenizer twice under a pressure of 300 kg/cm², thereby yielding a stable premixed organosiloxane latex. Separately, 10 parts of dodecylbenzenesulfonic acid and 90 parts of ion-exchanged water were fed into a reactor equipped with a reagent injection container, a cooling pipe, a jacket heater and a stirring device to prepare a 10% aqueous solution of dodecylbenzenesulfonic acid (acid catalyst aqueous solution). While heating this acid catalyst aqueous solution to 85° C., the premixed organosiloxane latex was dropwise added thereto over 2 hours. After the completion of the dropwise addition, the solution was kept at that temperature for 3 hours, and was then cooled down to 40° C. The resulting reaction product was neutralized to pH 7.0 with a 10% aqueous sodium hydroxide solution to obtain a latex of polyorganosiloxane (s-1). The solid content was measured with respect to a portion of the latex of polyorganosiloxane (s-1) dried at 180° C. for 30 minutes, and was found to be 18.2%. Further, the mass average particle diameter size of particles dispersed in the latex was 30 nm.

<Acid Group-Containing Copolymer Latex>

(Production of Acid Group-Containing Copolymer Latex (K-1))

Into a reactor equipped with a reagent injection container, a cooling pipe, a jacket heater and a stirring device, 200 parts of ion-exchanged water, 2 parts of potassium oleate, 4 parts of sodium dioctylsulfosuccinate, 0.003 parts of ferrous sulfate heptahydrate, 0.009 parts of disodium ethylenediaminetetraacetate, and 0.3 parts of sodium formaldehyde sulfoxylate were fed while flowing nitrogen gas, and the temperature was raised to 60° C. When the temperature reached 60° C., a mixture of 85 parts of n-butyl acrylate, 15 parts of methacrylic acid and 0.5 parts of cumene hydroperoxide was continuously added dropwise over 120 minutes. After the completion of the dropwise addition, the resulting was aged for 2 hours while maintaining the temperature at 60° C., thereby obtaining an acid group-containing copolymer latex (K-1) in which the solid content was 33%, the polymerization conversion was 96%, and the volume average particle size of the acid group-containing copolymer was 120 nm.

<Graft Copolymer (A)>

(Production of Graft Copolymer (A-1))

Into a reactor equipped with a reagent injection container, a cooling pipe, a jacket heater and a stirring device, 8.0 parts (solid content) of a latex of polyorganosiloxane (s-1) as polyorganosiloxane (s), 0.4 parts of a sodium alkyldiphenyl ether disulfonate were fed, followed by addition of 200 parts of ion-exchanged water, and the resulting was mixed. This was followed by addition of a mixture of 42.0 parts of n-butyl acrylate as an alkyl (meth)acrylate monomer for forming the alkyl (meth)acrylate rubbery polymer (a-1), 0.2 parts of allyl methacrylate as a polyfunctional monomer, and 0.1 part of t-butyl hydroperoxide. A nitrogen gas was flown through this reactor so as to substitute the inside atmosphere with nitrogen, and the temperature was raised to 60° C. When the internal temperature of the reactor reached 60° C., an aqueous solution of 0.0001 part of ferrous sulfate, 0.0003 parts of disodium ethylenediaminetetraacetate, and 0.2 parts of Rongalite in 10 parts of distilled water was added to initiate a radical polymerization. Due to the polymerization of the alkyl (meth)acrylate component, the temperature of the solution increased to 78° C. This state was maintained for 1 hour, and the polymerization was continued until the heat of polymerization became no longer detectable, thereby obtaining a latex of alkyl (meth)acrylate rubbery polymer (a-1) as a composite rubbery polymer. The volume average particle size of the alkyl (meth)acrylate rubbery polymer (a-1) dispersed in the latex was 90 nm. The proportion of particles with a particle size of 300 nm or more among all particles formed by the alkyl (meth)acrylate rubbery polymer (a-1) was 0%.

Then, after the liquid temperature inside the reactor decreased to 60° C., an aqueous solution 0.3 parts of Rongalite in 10 parts of ion-exchanged water was added. Next, a mixed solution of 2.5 parts of acrylonitrile, 7.5 parts of styrene, and 0.05 parts of t-butyl hydroperoxide was dropwise added over about 1 hour to implement the polymerization. After the dropping was completed, the resulting was held for 1 hour, followed by addition of an aqueous solution of 0.0002 parts of ferrous sulfate, 0.0002 parts of disodium ethylenediaminetetraacetate, and 0.25 parts of Rongalite in 10 parts of ion-exchanged water. Next, a mixed solution of 10.0 parts of acrylonitrile, 30.0 parts of styrene, and 0.2 parts of t-butyl hydroperoxide was dropwise added over about 40 minutes to implement the polymerization. After the completion of the dropwise addition, the resulting was allowed to stand for 1 hour, and was then cooled, thereby yielding a graft copolymer (A-1) latex. Subsequently, 250 parts of a 2% aqueous solution of calcium acetate was heated to 50° C. and stirred, 100 parts of the graft copolymer (A-1) latex was gradually dropwise added into this aqueous solution of calcium acetate to cause coagulation. The resulting coagulated product was separated, washed, and then dried, thereby yielding a graft copolymer (A-1) in the form of a dried powder.

(Production of Graft Copolymers (A-2), (A-4), (A-5) and (A-7))

Graft copolymers (A-2), (A-4), (A-5) and (A-7) were obtained by following the same procedure as for the production of the graft copolymer (A-1), except that the amounts (parts) of the polyorganosiloxane (s) (in terms of solid content), n-butyl acrylate and allyl methacrylate were changed as shown in Table 1.

(Production of Graft Copolymer (A-3))

Into a reactor equipped with a reagent injection container, a cooling pipe, a jacket heater and a stirring device, 0.2 parts of a dipotassium alkenyl succinate was fed, followed by addition of 200 parts of ion-exchanged water, and the resulting was mixed. This was followed by the addition of a mixture of 50.0 parts of n-butyl acrylate, 0.15 parts of allyl methacrylate, and 0.1 part oft-butyl hydroperoxide. Otherwise, the same procedure was followed as for the production of the graft copolymer (A-1), thereby obtaining a graft copolymer (A-3).

(Production of Graft Copolymer (A-6))

Into a reactor equipped with a reagent injection container, a cooling pipe, a jacket heater and a stirring device, 0.7 parts of a dipotassium alkenyl succinate was fed, followed by addition of 200 parts of ion-exchanged water, and the resulting was mixed. This was followed by the addition of a mixture of 50.0 parts of n-butyl acrylate, 0.3 parts of allyl methacrylate, and 0.1 part oft-butyl hydroperoxide. Otherwise, the same procedure was followed as for the production of the graft copolymer (A-1), thereby obtaining a graft copolymer (A-6).

With respect to the alkyl (meth)acrylate rubbery polymer (a) present in the graft copolymers (A-1) to (A-7), the volume average particle size and the proportion of polyfunctional monomer units per 100 parts by mass of the alkyl (meth)acrylate monomer units are shown in Table 1.

Blank cells in Table 1 indicate that the relevant components were not blended. Further, Table 1 shows values with their third decimal places being rounded for convenience, but the numerical values to be actually considered here are the calculated values before the rounding.

aminetetraacetate, 0.2 parts of sodium formaldehyde sulfoxylate, and 10 parts of distilled water was added to initiate a radical polymerization. After the heat of polymerization had been detected, the jacket temperature was set to 75° C., and the polymerization was continued until the heat of polymerization was no longer detected. This state was maintained for another one hour to obtain a latex of alkyl (meth)acrylate rubbery polymer (b-1) as a composite rubbery polymer (radical polymerization step). The volume average particle size of the alkyl (meth)acrylate rubbery polymer (b-1) dispersed in the latex was 100 nm.

Then, after the liquid temperature inside the reactor had decreased to 70° C., 0.1 part (in terms of solid content) of a 2% aqueous solution of sodium pyrophosphate was added (condensed acid salt addition step). Next, after adjusting the internal temperature to 70° C., 0.3 parts (in terms of solid content) of acid group-containing copolymer latex (K-1) was added, and the resulting was stirred for 30 minutes to carry out the enlargement (enlarging step). The volume average particle size of the alkyl (meth)acrylate rubbery polymer (b-1) dispersed in the obtained latex was 165 nm. The proportion of particles with a particle size of 300 nm or more among all particles formed by the alkyl (meth)acrylate rubbery polymer (b-1) after the enlargement was 15%.

To this latex of the alkyl (meth)acrylate rubbery polymer (b-1) after the enlargement, an aqueous solution of 0.001

TABLE 1

| Graft copolymer (A) | Alkyl (meth)acrylate rubbery polymer (a) | | | | | Vinyl monomer mixture (ml) | |
|---|---|---|---|---|---|---|---|
| | Polyorganosiloxane (S) [Part] | n-butyl acrylate [Part] | Allyl methacrylate [Part] | Amount of polyfunctional monomer units relative to 100 parts of the alkyl (meth)acrylate monomer units [Part] | Volume average particle size [nm] | Styrene [Part] | Acrylonitrile [Part] |
| A-1 | 8 | 42 | 0.2 | 0.48 | 90 | 37.5 | 12.5 |
| A-2 | 8 | 42 | 0.35 | 0.83 | 74 | 37.5 | 12.5 |
| A-3 | | 50 | 0.15 | 0.30 | 125 | 37.5 | 12.5 |
| A-4 | 8 | 42 | 0.05 | 0.12 | 98 | 37.5 | 12.5 |
| A-5 | 2 | 48 | 0.5 | 1.04 | 126 | 37.5 | 12.5 |
| A-6 | | 50 | 0.3 | 0.60 | 64 | 37.5 | 12.5 |
| A-7 | 8 | 42 | 0.3 | 0.71 | 135 | 37.5 | 12.5 |

<Graft Copolymer (B)>
(Production of Graft Copolymer (B-1))

Into a reactor equipped with a reagent injection container, a cooling pipe, a jacket heater and a stirring device, 4.0 parts (solid content) of a latex of polyorganosiloxane (s-1) as poly organosiloxane (s), 0.1 parts of a dipotassium alkenyl succinate and 200 parts of ion-exchanged water were fed and mixed. This was followed by addition of a mixture of 46.0 parts of n-butyl acrylate as an alkyl (meth)acrylate monomer for forming the alkyl (meth)acrylate polymer (b-1), 0.5 parts of allyl methacrylate as a polyfunctional monomer, and 0.1 part of t-butyl hydroperoxide. A nitrogen gas was flown through this reactor so as to substitute the inside atmosphere with nitrogen, and the temperature was raised to 60° C. When the internal temperature of the reactor reached 60° C., an aqueous solution consisting of 0.00075 parts of ferrous sulfate heptahydrate, 0.00023 parts of disodium ethylenedipart of ferrous sulfate heptahydrate, 0.003 parts of disodium ethylenediaminetetraacetate, 0.3 parts of Rongalite, and 10 parts of ion-exchanged water was added. Then, a mixed solution of 9 parts of acrylonitrile, 27 parts of styrene, and 0.15 parts of t-butyl hydroperoxide was added dropwise over 80 minutes to carry out a polymerization. After completion of the dropwise addition, the resulting was held at 75° C. for 30 minutes, and then a mixture of 3.5 parts of acrylonitrile, 10.5 parts of styrene, 0.05 parts of t-butyl hydroperoxide, and 0.03 parts of n-octyl mercaptan was added dropwise over 20 minutes to carry out a polymerization. After completion of the dropwise addition, the resulting was held at 75° C. for 30 minutes, followed by addition of 0.05 parts of cumene hydroperoxide. The resulting mixture was held at 75° C. for 30 minutes, and was then cooled, thereby yielding a graft copolymer (B-1) latex. Subsequently, 250 parts of a 2% aqueous solution of calcium acetate was heated to 60° C. and stirred, 100 parts of the graft copolymer (B-1) latex was gradually dropwise added into this aqueous solution of calcium acetate to cause coagulation. The resulting precipitate was separated, dehydrated, washed, and then dried, thereby yielding a graft copolymer (B-1) in the form of a dried powder.

(Production of Graft Copolymers (B-2), (B-4), (B-5), (B-7))

Graft copolymers (B-2), (B-4). (B-5) and (B-7) were obtained by following the same procedure as for the production of the graft copolymer (B-1), except that the amounts (parts) of the polyorganosiloxane (s)(in terms of solid content), n-butyl acrylate, allyl methacrylate, sodium pyrophosphate, and the acid group-containing copolymer latex were changed as shown in Table 2.

(Production of Graft Copolymer (B-3))

Into a reactor equipped with a reagent injection container, a cooling pipe, a jacket heater and a stirring device, 0.1 part of a dipotassium alkenyl succinate was fed, followed by addition of 200 parts of ion-exchanged water, and the resulting was mixed. This was followed by the addition of a mixture of 50.0 parts of n-butyl acrylate, 1.0 part of allyl methacrylate, and 0.1 part of t-butyl hydroperoxide. Otherwise, the same procedure was followed as for the production of the graft copolymer (A-3), thereby obtaining a graft copolymer (B-3).

(Production of Graft Copolymer (B-6))

Into a reactor equipped with a reagent injection container, a cooling pipe, a jacket heater and a stirring device, 0.2 parts of a dipotassium alkenyl succinate was fed, followed by addition of 200 parts of ion-exchanged water, and the resulting was mixed. This was followed by the addition of a mixture of 50.0 parts of n-butyl acrylate, 1.0 part of allyl methacrylate, and 0.1 part oft-butyl hydroperoxide. Otherwise, the same procedure was followed as for the production of the graft copolymer (A-3), thereby obtaining a graft copolymer (B-6).

With respect to the alkyl (meth)acrylate rubbery polymer (b) present in the graft copolymers (B-1) to (B-7), the volume average particle size, the proportion of polyfunctional monomer units per 100 parts by mass of the alkyl (meth)acrylate monomer units, and the proportion of particles with a particle size of 300 nm or more among all particles formed by the alkyl (meth)acrylate rubbery polymer (b) are shown in Table 2.

Blank cells in Table 2 indicate that the relevant components were not blended. Further, Table 2 shows values with their third decimal places being rounded for convenience, but the numerical values to be actually considered here are the calculated values before the rounding.

TABLE 2

| Graft copolymer (B) | Alkyl (meth)acrylate rubbery polymer (b) | | | | | | | | Vinyl monomer mixture (m2) | |
|---|---|---|---|---|---|---|---|---|---|---|
| | Polyorgano-siloxane (S) [Part] | n-butyl acrylate [Part] | Allyl methacrylate [Part] | Amount of polyfunctional monomer units relative to 100 parts of the alkyl (meth)acrylate monomer units [Part] | Sodium pyrophosphate [Part] | Acid group-containing copolymer latex [Part] | Volume average particle size [nm] | Proportion of particles of 300 nm or more [%] | Styrene [Part] | Acrylonitrile [Part] |
| B-1 | 4 | 46 | 0.5 | 1.09 | 0.1 | 0.3 | 165 | 15 | 37.5 | 12.5 |
| B-2 | 4 | 46 | 0.5 | 1.09 | 0.1 | 0.5 | 194 | 25 | 37.5 | 12.5 |
| B-3 | | 50 | 1 | 2.00 | | | 139 | 12 | 37.5 | 12.5 |
| B-4 | 4 | 46 | 0.3 | 0.65 | 0.1 | 0.2 | 163 | 14 | 37.5 | 12.5 |
| B-5 | 4 | 46 | 1.1 | 2.39 | 0.1 | 0.15 | 142 | 13 | 37.5 | 12.5 |
| B-6 | | 50 | 1 | 2.00 | | | 121 | 9 | 37.5 | 12.5 |
| B-7 | 4 | 46 | 0.5 | 1.09 | 0.2 | 0.3 | 225 | 22 | 37.5 | 12.5 |

<Vinyl Copolymer (C)>
(Production of Vinyl Copolymer (C-1))

70 parts of methyl methacrylate, 21 parts of styrene, and 9 parts of acrylonitrile were polymerized by known suspension polymerization method to yield a vinyl copolymer (C-1) with a mass average molecular weight (Mw) of $8\times10^4$.

(Production of Vinyl Copolymer (C-2))

65 parts of methyl methacrylate, 21 parts of styrene, and 14 parts of acrylonitrile were polymerized by known suspension polymerization method to yield a vinyl copolymer (C-2) with a mass average molecular weight (Mw) of $12\times10^4$.

(Production of Vinyl Copolymer (C-3))

48 parts of methyl methacrylate, 30 parts of styrene, and 22 parts of acrylonitrile were polymerized by known suspension polymerization method to yield a vinyl copolymer (C-3) with a mass average molecular weight (Mw) of $10\times10^4$.

(Vinyl Copolymer (C-4))

A copolymer of the vinyl monomer mixture (m3) containing alkyl (meth)acrylate monomers (product name "Acrypet VH5" manufactured by Mitsubishi Chemical Corporation, a copolymer of 98 parts of methyl methacrylate and 2 parts of methacrylic acid, with a mass average molecular weight (Mw) of $7\times10^3$) was used as the vinyl copolymer (C-4).

(Production of Vinyl Copolymer (C-5))

70 parts of methyl methacrylate, 10 parts of α-methylstyrene, and 20 parts of N-phenylmaleimide were polymerized by known suspension polymerization method to yield a vinyl copolymer (C-5) with a mass average molecular weight (Mw) of $14\times10^4$.

(Vinyl Copolymer (C-6))

A copolymer of the vinyl monomer mixture (m3) containing alkyl (meth)acrylate monomers (product name "Polyimilex PML203" manufactured by Nippon Shokubai Co., Ltd., a methyl methacrylate/N-phenylmaleimide/N-cyclohexylmaleimide/styrene copolymer, with a mass average molecular weight (Mw) of $20\times10^4$) was used as the vinyl copolymer (C-6).

Examples 1 to 19, Comparative Examples 1 to 15

The graft copolymer (A), the graft copolymer (B), and the vinyl copolymer (C) in the amounts (parts) shown in Tables 3 to 6, as well as 1 part of ethylene bisstearylamide, 0.4 parts of ADEKA STAB LA-46 (manufactured by ADEKA Corporation) as an ultraviolet absorber, 0.4 parts of ADEKA STAB LA-57 (manufactured by ADEKA Corporation) as a hindered amine light stabilizer, and 1.0 part of carbon black (product name "ROYAL BLACK 919P" manufactured by Koshigaya Kasei Co., Ltd.) were mixed using a Henschel mixer. The obtained mixture was melt-kneaded at 250° C. using a screw extruder (product name "TEX-30α type twin screw extruder" manufactured by Japan Steel Works, Ltd.), and then pelletized with a pelletizer to obtain a thermoplastic resin composition.

Various test pieces (molded products) were prepared using the obtained thermoplastic resin composition, and impact resistance, falling ball impact resistance under low temperature environments, color development, scratch resistance, and heat resistance were evaluated. Also, the fluidity was evaluated using the pellets of the thermoplastic resin composition. The results are shown in Tables 3 to 6.

Blank cells in Tables 3 to 6 indicate that the relevant components were not blended.

TABLE 3

| | | | Ex.1 | Ex.2 | Ex.3 | Ex.4 | Ex.5 | Ex.6 | Ex.7 | Ex.8 | Ex.9 | Ex.10 | Ex.11 |
|---|---|---|---|---|---|---|---|---|---|---|---|---|---|
| Blending ratio [Part by mass] | Graft copolymer (A) | A-1 | 26 | 32 | | | 26 | 26 | 13 | 15 | 30 | 34 | 40 |
| | | A-2 | | | 26 | | | | | | | | |
| | | A-3 | | | | 26 | | | | | | | |
| | Graft copolymer (B) | B-1 | 18 | 22 | 18 | 18 | | | 31 | 29 | 14 | 10 | 4 |
| | | B-2 | | | | | 18 | | | | | | |
| | | B-3 | | | | | | 18 | | | | | |
| | Vinyl copolymer (C) | C-1 | 27 | 27 | 27 | 27 | 27 | 27 | 27 | 27 | 27 | 27 | 27 |
| | | C-5 | 29 | 19 | 29 | 29 | 29 | 29 | 29 | 29 | 29 | 29 | 29 |
| Proportion of rubbery polymer [%] | | | 22 | 27 | 22 | 22 | 22 | 22 | 22 | 22 | 22 | 22 | 22 |
| Proportion of particles of 300 nm or more [%] | | | 6 | 6 | 6 | 6 | 10.5 | 5 | 10.5 | 10 | 5 | 3.5 | 1.5 |
| Evaluation results | Charpy Impact Strength [kJ/m$^2$] | | 10.2 | 13.3 | 9.7 | 10.6 | 10.8 | 9.6 | 11.1 | 10.5 | 10.2 | 10.1 | 9.7 |
| | Falling ball impact resistance (−30° C.)[cm] | | 240 | 240 | 230 | 220 | 240 | 220 | 230 | 230 | 230 | 220 | 210 |
| | Color development (L*) | | 4.3 | 4.8 | 4.1 | 4.3 | 4.4 | 4.2 | 4.5 | 4.3 | 4.2 | 4.2 | 4.2 |
| | Scratch resistance (ΔL*) | | 0.5 | 0.3 | 0.5 | 0.8 | 0.5 | 0.8 | 0.5 | 0.6 | 0.4 | 0.5 | 0.5 |
| | Melt volume rate (230° C.) [cm$^3$/10 min] | | 5.9 | 4.1 | 5.5 | 6.1 | 6.1 | 5.7 | 5.6 | 5.8 | 6.1 | 6.3 | 6.5 |
| | Deflection temperature under load (1.80 MPa) [° C.] | | 79.6 | 78.8 | 79.9 | 79.5 | 80.1 | 80.2 | 79.9 | 80.0 | 80.0 | 79.5 | 79.7 |

TABLE 4

| | | | Ex.12 | Ex.13 | Ex.14 | Ex.15 | Ex.16 | Ex.17 | Ex.18 | Ex.19 |
|---|---|---|---|---|---|---|---|---|---|---|
| Blending ratio [Part by mass] | Graft copolymer (A) | A-1 | 26 | 26 | 32 | | 26 | 32 | 26 | 26 |
| | | A-3 | | | | 26 | | | | |
| | Graft copolymer (B) | B-1 | 18 | 18 | 22 | | 18 | 22 | 18 | 18 |
| | | B-3 | | | | 18 | | | | |
| | Vinyl copolymer (C) | C-1 | | | | 56 | 56 | 46 | | 27 |
| | | C-2 | | | | | | | 56 | |
| | | C-3 | 56 | | | | | | | |
| | | C-4 | | 56 | 46 | | | | | |
| | | C-5 | | | | | | | | |
| | | C-6 | | | | | | | | 29 |
| Proportion of rubbery polymer [%] | | | 22 | 22 | 27 | 22 | 22 | 27 | 22 | 22 |
| Proportion of particles of 300 nm or more [%] | | | 6 | 6 | 6 | 5 | 6 | 6 | 6 | 6 |
| Evaluation results | Charpy Impact Strength [kJ/m$^2$] | | 12.4 | 10.8 | 13.4 | 10.5 | 11.6 | 16.0 | 15.1 | 10.0 |
| | Falling ball impact resistance (−30° C.)[cm] | | 240 | 190 | 200 | 200 | 240 | 240 | 240 | 240 |
| | Color development (L*) | | 4.9 | 4.7 | 4.9 | 4.6 | 4.2 | 4.9 | 4.4 | 4.3 |
| | Scratch resistance (ΔL*) | | 0.7 | 0.3 | 0.4 | 0.9 | 0.6 | 0.5 | 0.6 | 0.5 |
| | Melt volume rate (230° C.) [cm$^3$/10 min] | | 26.6 | 6.4 | 3.9 | 27.6 | 28.6 | 171. | 16.9 | 6.0 |
| | Deflection temperature under load (1.80 MPa) [° C.] | | 72.5 | 74.9 | 70.1 | 71.3 | 71.3 | 70.4 | 70.9 | 81.0 |

TABLE 5

| | | | Comp. Ex.1 | Comp. Ex.2 | Comp. Ex.3 | Comp. Ex.4 | Comp. Ex.5 | Comp. Ex.6 | Comp. Ex.7 | Comp. Ex.8 | Comp. Ex.9 |
|---|---|---|---|---|---|---|---|---|---|---|---|
| Blending ratio [Part by mass] | Graft copolymer (A) | A-1 | | | | | 26 | 26 | 26 | 26 | 18 |
| | | A-4 | 26 | | | | | | | | |
| | | A-5 | | 26 | | | | | | | |
| | | A-6 | | | 26 | | | | | | |
| | | A-7 | | | | 26 | | | | | |
| | Graft copolymer (B) | B-1 | 18 | 18 | 18 | 18 | | | | | |
| | | B-4 | | | | | | 18 | | | |
| | | B-5 | | | | | | | 18 | | |
| | | B-6 | | | | | | | | 18 | |
| | | B-7 | 27 | | | | | | | 18 | 26 |
| | Vinyl copolymer (C) | C-1 | 56 | 56 | 56 | 56 | 56 | 56 | 56 | 56 | 56 |
| Proportion of rubbery polymer [%] | | | 22 | 22 | 22 | 22 | 22 | 22 | 22 | 22 | 22 |
| Proportion of particles of 300 nm or more [%] | | | 6 | 6 | 6 | 6 | 6 | 5 | 4 | 9 | 13 |
| Evaluation results | Charpy Impact Strength [kJ/m$^2$] | | 12.2 | 8.4 | 9.1 | 11.5 | 13.0 | 8.2 | 7.7 | 12.8 | 12.3 |
| | Falling ball impact resistance (−30° C.)[cm] | | 240 | 130 | 120 | 240 | 240 | 130 | 100 | 240 | 240 |
| | Color development (L*) | | 5.8 | 4.2 | 4.3 | 5.3 | 5.5 | 4.2 | 4.3 | 6.2 | 6.5 |
| | Scratch resistance (ΔL*) | | 0.7 | 1.1 | 1.2 | 0.5 | 0.8 | 0.8 | 0.7 | 0.8 | 0.8 |
| | Melt volume rate (230° C.) [cm$^3$/10 min] | | 28.8 | 27.7 | 26.1 | 29.2 | 28.5 | 28.5 | 26.7 | 28.7 | 27.4 |
| | Deflection temperature under load (1.80 MPa) [° C.] | | 71.7 | 72.0 | 71.7 | 71.4 | 71.6 | 72.1 | 71.0 | 72.1 | 71.8 |

TABLE 6

|  |  |  | Comp. Ex.10 | Comp. Ex.11 | Comp. Ex.12 | Comp. Ex.13 | Comp. Ex.14 | Comp. Ex.15 |
|---|---|---|---|---|---|---|---|---|
| Blending ratio [Part by mass] | Graft copolymer (A) | A-1 | 44 |  | 24 | 35 |  |  |
|  | Graft copolymer (B) | B-1 |  | 44 | 16 | 23 |  |  |
|  | Vinyl Graft copolymer (C) | C-1 | 27 | 27 | 60 | 42 | 100 |  |
|  |  | C-4 |  |  |  |  |  | 100 |
|  |  | C-5 | 29 | 29 |  |  |  |  |
| Proportion of rubbery polymer [%] |  |  | 22 | 22 | 20 | 29 | 0 | 0 |
| Proportion of particles of 300 nm or more [%] |  |  | 0.5 | 15 | 6 | 6 | — | — |
| Evaluation results | Charpy Impact Strength [kJ/m$^2$] |  | 9.0 | 10.8 | 8.8 | 14.6 | 1.9 | 0.8 |
|  | Falling ball impact resistance (−30° C.)[cm] |  | 150 | 200 | 120 | 240 | 10 | 10 |
|  | Color development (L*) |  | 4.2 | 6.0 | 4.6 | 5.4 | 3.3 | 2.1 |
|  | Scratch resistance (ΔL*) |  | 0.5 | 0.5 | 0.9 | 0.7 | 4.3 | 2.6 |
|  | Melt volume rate (230° C.) [cm$^3$/10 min] |  | 6.5 | 5.3 | 29.0 | 8.0 | 68.0 | 12.2 |
|  | Deflection temperature under load (1.80 MPa) [° C.] |  | 80.7 | 79.6 | 72.5 | 70.8 | 77.0 | 83.0 |

The molded products obtained from the thermoplastic resin compositions of Examples 1 to 19 were excellent in impact resistance, falling ball impact resistance under low temperature environments, and color development (jet blackness).

Thus, it has been shown that the thermoplastic resin composition of the first aspect of the present invention can provide a molded product excellent in impact resistance, falling ball impact resistance under low temperature environments, and color development (jet blackness).

From the comparison between Examples 3 and 4 and between Examples 5 and 6, it can be understood that when the alkyl (meth)acrylate rubbery polymer contains polyorganosiloxane (s), the scratch resistance of the molded product can be improved.

From the comparison between Examples 13 and 16 and between Examples 14 and 17, it can be understood that when the vinyl copolymer (C) contains a copolymer of the vinyl monomer mixture (m3) containing 50 to 99% by mass of alkyl (meth)acrylate monomers, 1 to 50% by mass of aromatic vinyl monomers and 0 to 49% by mass of vinyl monomers copolymerizable therewith, the molded product can be improved in terms of falling ball impact resistance under low temperature environments.

From the comparison between Example 1 and Examples 12 to 18, it has been confirmed that when the vinyl copolymer (C) contains a copolymer of the vinyl monomer mixture (m3) containing the maleimide monomer, the molded product can be further improved in terms of heat resistance.

On the other hand, the molded products obtained from the thermoplastic resin compositions of Comparative Examples 1 to 15 were inferior in any of impact resistance, falling ball impact resistance under low temperature environments, and color development (jet blackness).

INDUSTRIAL APPLICABILITY

Molded products using the thermoplastic resin composition of the present invention are useful as vehicle interior and exterior parts, office equipment, home appliances, building materials, etc., and are particularly useful as vehicle exterior parts.

REFERENCE SIGNS LIST

10 Jig
11 Tip portion
12 Piece of Kanakin No. 3
13 Molded product (Ma)

The invention claimed is:

1. A thermoplastic resin composition comprising a resin component, wherein:
the resin component comprises a graft copolymer (A), a graft copolymer (B), and a vinyl copolymer (C),
the resin component is present in an amount of 90 to 100% by mass, based on a total mass of the thermoplastic resin composition,
a sum of amounts of the graft copolymer (A) and the graft copolymer (B) is 25 to 55% by mass, and an amount of the vinyl copolymer (C) is 45 to 75% by mass, provided that a sum of amounts of the graft copolymer (A), the graft copolymer (B) and the vinyl copolymer (C) is 100% by mass,
a proportion of a rubbery polymer contained in the thermoplastic resin composition is 21 to 28% by mass, based on a total mass of the thermoplastic resin composition, and a proportion of particles with a particle size of 300 nm or more among all particles formed by the rubbery polymer is 1 to 11% by mass, based on a total mass of the all particles,
the graft copolymer (A) is a graft copolymer obtained by polymerizing 80 to 20% by mass of a vinyl monomer mixture (m1) in the presence of an alkyl acrylate rubbery polymer (a) containing 0.2 parts by mass or more and less than 0.9 parts by mass of polyfunctional monomer units per 100 parts by mass of alkyl acrylate monomer units, provided that a sum of amounts of the alkyl acrylate rubbery polymer (a) and the vinyl monomer mixture (m1) is 100% by mass, wherein the alkyl acrylate rubbery polymer (a) has a volume average particle size of 70 nm or more and less than 130 nm,
the graft copolymer (B) is a graft copolymer obtained by polymerizing 80 to 20% by mass of a vinyl monomer mixture (m2) in the presence of an alkyl acrylate rubbery polymer (b) containing 0.9 to 2.2 parts by mass of polyfunctional monomer units per 100 parts by mass of alkyl acrylate monomer units, provided that a sum of amounts of the alkyl acrylate rubbery polymer (b) and the vinyl monomer mixture (m2) is 100% by mass, wherein the alkyl acrylate rubbery polymer (b) has a volume average particle size of 130 nm to 200 nm, and the vinyl copolymer (C) comprises a vinyl copolymer obtained by polymerizing a vinyl monomer mixture (m3) comprising an alkyl acrylate monomer, an aromatic vinyl monomer, and a vinyl cyanide monomer.

2. The thermoplastic resin composition according to claim 1, wherein the alkyl acrylate rubbery polymer (a) is a rubbery polymer comprising a polyorganosiloxane.

3. The thermoplastic resin composition according to claim 1, wherein the alkyl acrylate rubbery polymer (b) is a rubbery polymer comprising a polyorganosiloxane.

4. The thermoplastic resin composition according to claim 1, wherein the vinyl copolymer (C) further comprises a vinyl copolymer obtained by polymerizing a vinyl monomer mixture comprising an alkyl (meth)acrylate monomer, an aromatic vinyl monomer, and a maleimide monomer.

5. The thermoplastic resin composition according to claim 1, wherein a proportion of the alkyl acrylate rubbery polymer (a) is 30 to 90% by mass, and a proportion of the alkyl acrylate rubbery polymer (b) is 70 to 10% by mass, provided that a sum of amounts of the alkyl acrylate rubbery polymer (a) and the alkyl acrylate rubbery polymer (b) is 100% by mass.

6. A molded product using the thermoplastic resin composition of claim 1.

* * * * *